(12) United States Patent
Jonker et al.

(10) Patent No.: US 8,234,381 B1
(45) Date of Patent: Jul. 31, 2012

(54) METHOD AND APPARATUS FOR ACCESSING NETWORKS BY A MOBILE DEVICE

(75) Inventors: Niels Jonker, Santa Monica, CA (US); Sky Dayton, Santa Monica, CA (US); William Paul Allan McDaniel, Clearwater, FL (US)

(73) Assignee: Boingo Wireless, Inc., Los Angeles, CA (US)

( * ) Notice: Subject to any disclaimer, the term of this patent is extended or adjusted under 35 U.S.C. 154(b) by 0 days.

(21) Appl. No.: 13/243,745

(22) Filed: Sep. 23, 2011

Related U.S. Application Data

(63) Continuation of application No. 12/355,722, filed on Jan. 16, 2009, now abandoned, which is a continuation of application No. 10/325,450, filed on Dec. 19, 2002, now Pat. No. 7,483,984.

(60) Provisional application No. 60/341,903, filed on Dec. 19, 2001.

(51) Int. Cl.
*G06F 15/16* (2006.01)
*G06F 15/173* (2006.01)

(52) U.S. Cl. ........ 709/226; 709/203; 709/224; 709/225; 709/229

(58) Field of Classification Search ................ 709/204, 709/223; 455/39, 411, 423; 370/245, 329
See application file for complete search history.

(56) References Cited

U.S. PATENT DOCUMENTS

| | | | |
|---|---|---|---|
| 5,903,832 A | 5/1999 | Seppanen et al. | |
| 5,953,653 A | 9/1999 | Josenhans et al. | |
| 6,006,333 A | 12/1999 | Nielsen | |
| 6,269,395 B1 | 7/2001 | Blatherwick et al. | |
| 6,466,783 B2 | 10/2002 | Dahm et al. | |
| 6,484,027 B1 | 11/2002 | Mauney et al. | |
| 6,587,680 B1 * | 7/2003 | Ala-Laurila et al. | .......... 455/411 |
| 6,742,116 B1 * | 5/2004 | Matsui et al. | ................. 709/204 |
| 6,966,060 B1 * | 11/2005 | Young et al. | .................. 709/223 |
| 6,993,666 B1 | 1/2006 | Hokkanen et al. | |
| 2002/0007461 A1 | 1/2002 | Garrison | |
| 2002/0176366 A1 * | 11/2002 | Ayyagari et al. | .............. 370/245 |
| 2003/0050041 A1 | 3/2003 | Wu | |
| 2003/0061363 A1 | 3/2003 | Bahl et al. | |
| 2003/0064718 A1 * | 4/2003 | Haines et al. | ................. 455/423 |
| 2003/0065818 A1 | 4/2003 | Anderson et al. | |

(Continued)

OTHER PUBLICATIONS

Nguyen, Quang N., Examiner U.S. Patent Office, U.S. Appl. No. 12/355,722, filed Jan. 16, 2009, in Office Action dated Mar. 25, 2011, 15 pages.

*Primary Examiner* — Quang N. Nguyen
(74) *Attorney, Agent, or Firm* — Fish & Richardson P.C.

(57) ABSTRACT

An access client hosted by a mobile computing device accesses carrier networks using wireless access points and uses an access point database to identify access points and carrier networks. The access client uses methods and tokens databases to access carrier networks. The access client updates the databases using an access server when coupled to a carrier network. The access client transmits user information to the carrier network, which uses the information to perform authenticate and generate session data. The carrier network transmits session data to the access server, which uses session data to generate billing information. The access client also collects network performance data for access points and carrier networks, and transmits network performance data to the access server. The access server aggregates network performance data from access clients to generate quality of service reports. The access client includes detection and evaluation features for selecting access points.

18 Claims, 19 Drawing Sheets

U.S. PATENT DOCUMENTS

| | | |
|---|---|---|
| 2004/0001467 A1 | 1/2004 | Cromer et al. |
| 2004/0003060 A1 | 1/2004 | Asoh et al. |
| 2004/0066759 A1* | 4/2004 | Molteni et al. ............... 370/329 |
| 2004/0111520 A1 | 6/2004 | Krantz et al. |
| 2004/0198220 A1* | 10/2004 | Whelan et al. ................. 455/39 |

* cited by examiner

```
var token = new ActiveXObject("wruntimeVB.token")
var http = new ActiveXObject("wruntimeVB.http")
var https = new ActiveXObject("wruntimeVB.https")        } 1700
var mReturn = new ActiveXObject("wruntimeVB.return")
var err = new ActiveXObject("wruntimeVB.error")

token.Init(err);
https.Init(err);
http.Init(err);        } 1702
mReturn.Init(WScript);

try {
    token.load("basic");  ⎯1704
    https.GetUrl("http://www.accessserver.com/", "", "", false);  ⎯1706
    var response = https.GetResponseHeader("Location");  ⎯1708
    if (response.length < 1 {  ⎯1710
        mReturn.success();
    }
    var qmark = response.search(/\?/);  ⎯1712
    var querystring = response.slice(qmark+1);  ⎯1714 https.AddPostPairs(querystring);  ⎯1716
    https.AddPostVariable("username", "boingo%2f" + token.username);  ⎯1718
    https.AddPostVariable("password", token.password);  ⎯1720
    https.PostUrl("https://roamer.accesscontroller.net/roamer_login.adp", "", "");  ⎯1722 var result = https.Response.HTML;  ⎯1724 if (result.indexOf("<!--AuthMessage=Invalid Password.-->") > -1) {  ⎯1725
        mReturn.error("Invalid Password!");  ⎯1726
    } if (result.indexOf("<!--SessionId") == -1) {  ⎯1728
        mReturn.error("Authentication Failed!  Please try again.");  ⎯1729
    }

}
          ⎯1730
catch (e) {
    Return.exception()
} mReturn.success()  ⎯1732
```

*Fig. 16*

```
<?xml version="1.0"?>

<authmethod name='example_get' ssid='Alpha'>  — 1800
    token.load("tok1")  — 1802
    https.get("www.test.com", token.username, token.password)  — 1804
    if (err.number != 0) {  — 1805
    return.error("<html><h1>BAD ERROR</h1></html>")
    }                                                           — 1806
</authmethod>

<authmethod name='example_get_w_realm' ssid='Bravo'>  — 1808
    token.load("tok1")  — 1810
    https.get("www.test.com")  — 1812
     token.load(https.response.forms("myform").get("realm"))  — 1814
     https.get("www.test.com", token.username, token.password)  — 1816
</authmethod>

<authmethod name='example_post' ssid='Charlie'>  — 1818
    token.load("tok2")  — 1820
    https.get("www.test.com")  — 1822
    https.postvariables.add("uname", token.username)  — 1824
    https.postvariables.add("pword", token.password)  — 1826
    https.post(https.form1.url)  — 1828
</authmethod>

<Authtoken name='tok1'>  — 1830
    <username>micro_carrier_1</>  — 1832
    <password>pwd1</>  — 1834
>/Authtoken>

<Authtoken name='tok2'>  — 1836
    <username>micro_carrier_2</>  — 1838
    <password>pwd2</>  — 1840
>/Authtoken>

<Authtoken name='basic'>  — 1842
    <realm>mammoth</>  — 1844
</Authtoken>
```

// start static prefix code
//
var token = new ActiveXObject("wacket.token")  ⎫
var http = new ActiveXObject("wacket.http")    ⎪
var https = new ActiveXObject("wacket.https")  ⎬  1900
var return = new ActiveXObject("wacket.return")⎪
var err = new ActiveXObject("wacket.err")      ⎭ token.Init(err);    ⎫
https.Init(err);    ⎪
http.Init(err);     ⎬  1902
return.Init(WScript);⎭ try {

// start code from download
        //
        token.load("tok1")  ⟿ 1904
        https.get("www.text.com", token.username, token.password)  ⟿ 1906
         if (err.number != 0) {
                return.error("<html><h1>BAD ERROR</h1></html>")  ⟿ 1908
         }

//
// end code from download

} catch (e) {
        return.exception()  ⟿ 1910
} return.success()
//
// end static suffix code  ⟿ 1912

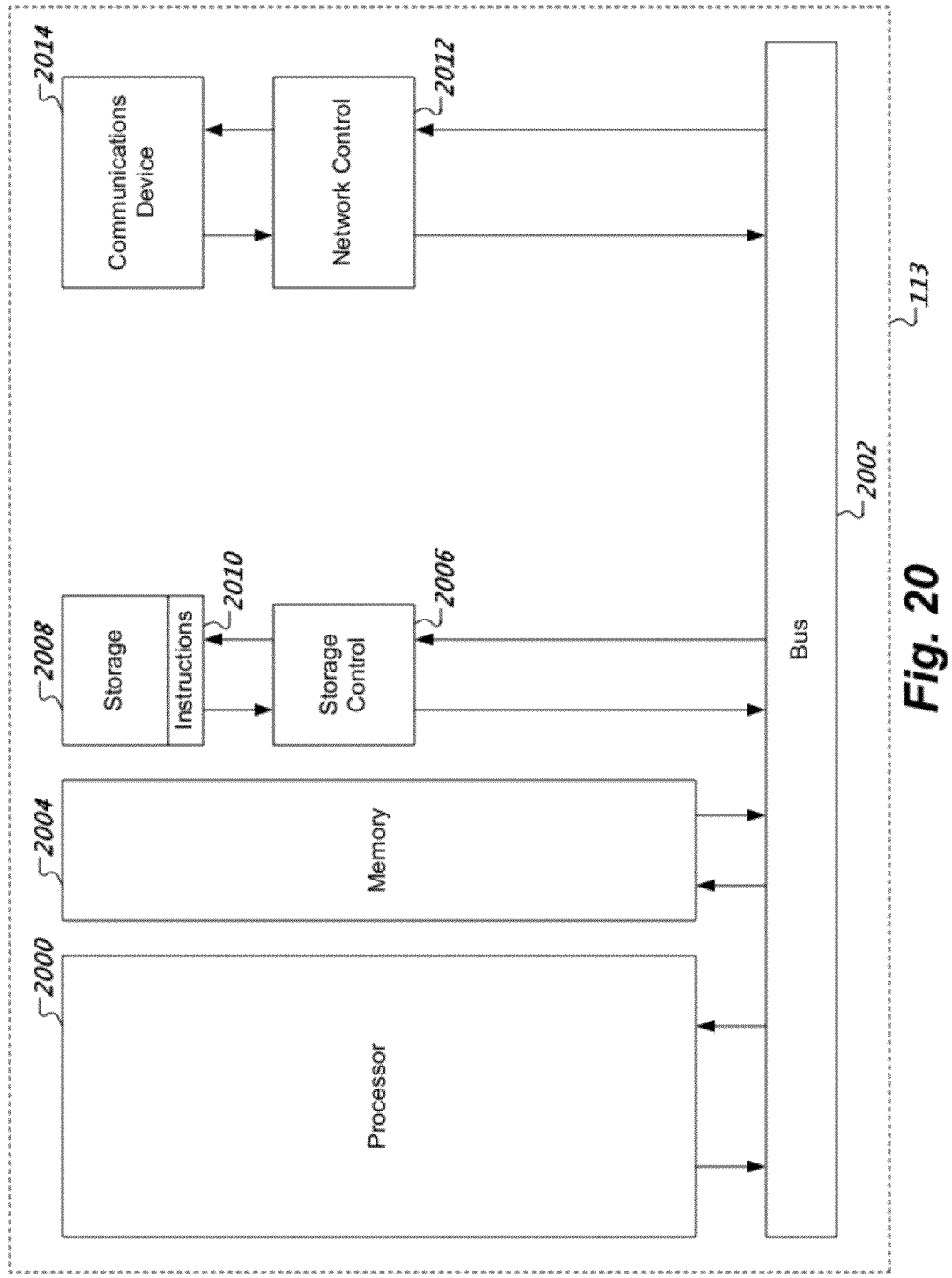

METHOD AND APPARATUS FOR ACCESSING NETWORKS BY A MOBILE DEVICE

PRIORITY CLAIMS AND CROSS REFERENCE TO RELATED APPLICATIONS

This patent document is a continuation of and claims the benefit of U.S. patent application Ser. No. 12/355,722, filed Jan. 16, 2009, and entitled "Method and Apparatus for Accessing Networks by a Mobile Device," which is a continuation of and claims the benefit of U.S. patent application Ser. No. 10/325,450, filed Dec. 19, 2002, and entitled "Method and Apparatus for Accessing Networks by a Mobile Device" (now U.S. Pat. No. 7,483,984), which claims the benefit of U.S. Provisional Patent Application No. 60/341, 903, filed Dec. 19, 2001. All of the above identified applications are incorporated herein by reference in their entirety.

BACKGROUND OF THE INVENTION

This invention pertains generally to the field of mobile computing and more specifically to accessing a computer or communications network by a mobile computing device.

Multiple carriers are installing public wireless carrier networks in high-traffic zones for the mobile business executive. The various locations include hotels, airports, and increasingly in restaurants and coffee shops. There are already a number of wireless-based Internet Service Providers (ISPs). These ISPs provide Internet access in public spaces such as hotels, airports, conference centers and retail establishments. The ISPs typically strike a deal with a landlord where the ISP pays to deploy Access Points (APs) in the facility and then either pays the landlord monthly fees and/or a cut of revenue. Airport authorities are getting into the game, signing up one or more wireless ISPs to deploy APs in airport terminals. In another deployment model, landlords buy the equipment to provide APs and managed network providers agree to manage the network for the landlords.

Not unlike the early days of the commercial Internet, each provider of wireless Internet access infrastructure in public spaces has a different mode of deployment, requires a different configuration of the user's machine and a different account and billing relationship. This deployment model may lead to several problems for a user. For example, multiple carriers mean multiple accounts for the user. Logging onto each successive network means needing a different logon account, and being billed from several sources. Also, networks are still sufficiently sparse as to present a challenge for the user to know when one is encountered, and to which carrier that network belongs. Additionally, inconsistencies in how the networks are configured can present connection hurdles to the vast majority of users who are not well versed in the technology or network management. Finally, configuration of mobile computing device network interface cards is still a one-off proposition. Users presently using Original Equipment Manufacturer (OEM) software supplied by manufacturers of network interface cards may not be able to negotiate different networks, (i.e., home, office, public) effortlessly and easily log onto all public and private networks.

SUMMARY OF THE INVENTION

A method and apparatus for accessing wireless carrier networks by mobile computing devices are provided. An access client hosted by a mobile computing device accesses carrier networks using wireless access points. The access client uses an access point database to identify access points and carrier networks. The access client uses a method database and a token database to access the carrier networks. The access client updates the access point database, the method database, and the token database using an access server when the access client is operably coupled to a carrier network. The access client transmits user information to the carrier network. The carrier network uses the user information to authenticate the user and to generate session data while the user is accessing the carrier network. The carrier network transmits the session data to the access server. The access server uses the session data to generate billing information for the user. The access client also collects network performance data for individual access points and carrier networks. The access client transmits the network performance data to the access server. The access server aggregates network performance data from a plurality of access clients to generate quality of server reports for both individual access points and carrier networks. The access client further includes access point detection and evaluation features for use by a user in selecting access points available at a single location.

In one aspect of the invention, a method is provided for accessing a carrier network by an access client. The access client detects carrier network signals and determines a carrier network identifier from the carrier network signals. The access client gets an access method from a method database using the network identifier. The access client then uses interpretable or executable instructions included in the access method to get a token from a token database and access the carrier network using the access method and the token.

In another aspect of the invention, the token includes a user identifier set, such as a username and a user password, used to access the carrier network.

In another aspect of the invention, the access client transmits a method update request to an access server through the carrier network and receives a method update in response. The access client then uses the method update to update the method database.

In another aspect of the invention, the access client transmits a token update to an access server through the carrier network and receives a token update in response. The access client then updates the token database using the token update. In another aspect of the invention, the tokens stored in the token database are encrypted and the access client uses a base token to decrypt the encrypted tokens.

In another aspect of the invention, a method is provided that enables an access client to display to a user a list of carrier networks available for access. The access client detects carrier network signals transmitted from a plurality of carrier networks and determines carrier network identifiers using the carrier network signals. The access client then uses the carrier network identifiers to get carrier network information from an access point database and generates a user selectable list of carrier network identifiers using the carrier network information.

In another aspect of the invention, the access client sorts the selectable list of carrier network identifiers according to user preferences.

In another aspect of the invention, wherein one or more of the carrier networks belong to a carrier network system, the access client sorts the list of carrier network identifiers using business logic corresponding to the carrier network system.

In another aspect of the invention, the access client aggregates carrier network identifiers associated with the carrier network system and displays a carrier network system identifier instead of the carrier network identifiers.

In another aspect of the invention, the access client determines from the network carrier signals a network standard used by a carrier network and displays a network standard indicator in association with the carrier network's identifier.

In another aspect of the invention, the access client determines from the network carrier signals if a carrier network is transmitting and receiving encrypted data. If so, the access client displays an encryption indicator in association with the carrier network's identifier.

BRIEF DESCRIPTION OF THE DRAWINGS

These and other features, aspects, and advantages of the present invention will become better understood with regard to the following description, appended claims, and accompanying drawings where:

FIG. 16 is a method script in accordance with an exemplary embodiment in accordance with the present invention;

FIG. 17 and FIG. 18 are portions of an extensible markup language document in accordance with an exemplary embodiment of the present invention;

FIG. 20 is a block diagram of an architecture of a general purpose computer suitable for use as an access server host in accordance with an exemplary embodiment of the present invention.

DETAILED DESCRIPTION

Figure 1:
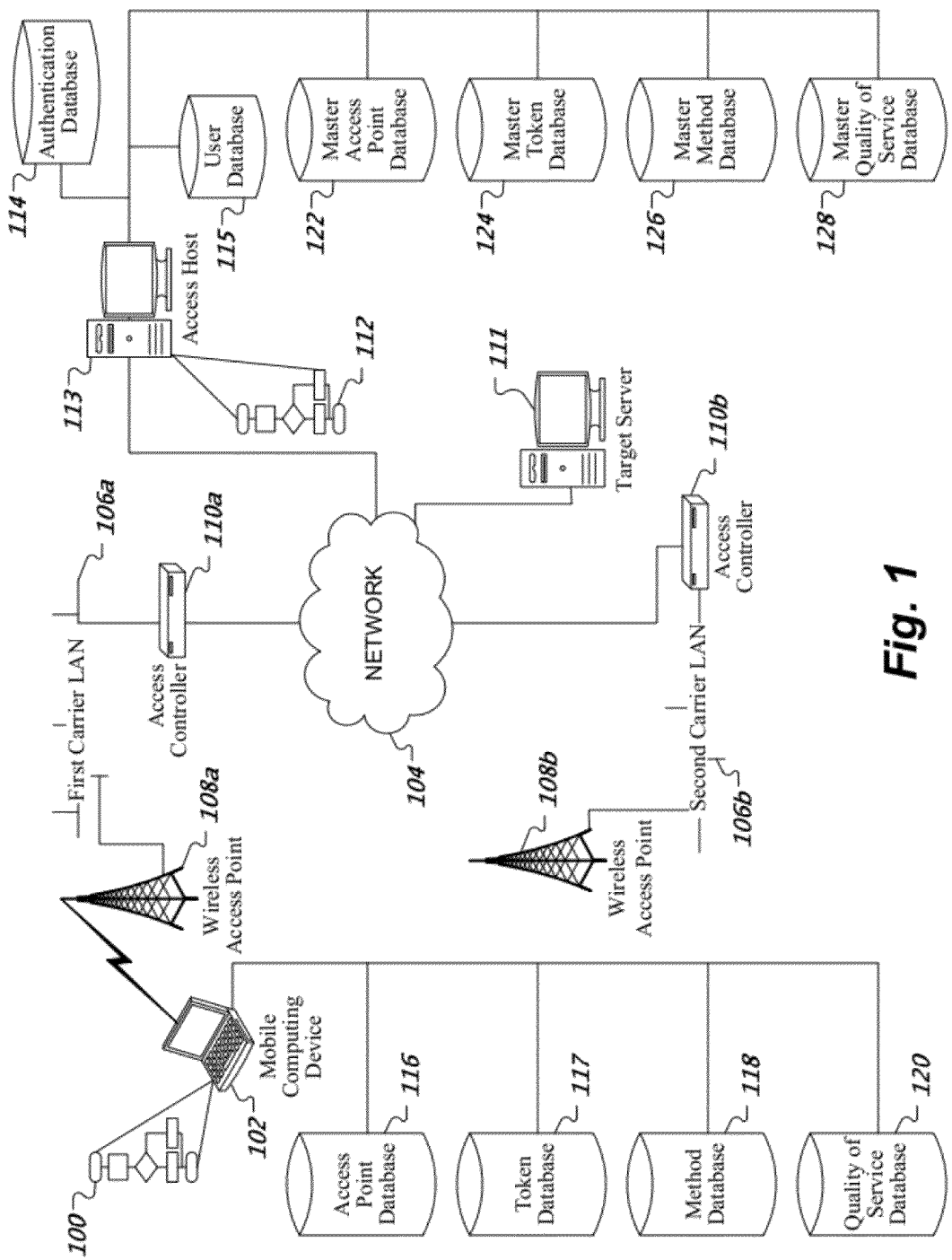
FIG. 1 is a block diagram of a mobile computing device accessing a network in accordance with an exemplary embodiment of the present invention.

FIG. 1 is a diagram of a mobile computing device accessing a computer network in accordance with an exemplary embodiment of the present invention. An access client 100 hosted by a mobile computing device 102 accesses a network 104 via a carrier network 106 using a wireless Access Point (AP) 108a. Access to the carrier network is controlled by an access controller 110a. The access client negotiates a connection with the access controller to gain access to the network through the carrier network. Once the access client has negotiated a connection with the access controller, other processes hosted by the mobile computing device may use the network for accessing services such as services offered by a target server 111. The access client negotiates with the access controller using network data and account management data made accessible by an access server 112 hosted by an access host 113 and coupled to an authentication database 114. The access server is further coupled to a user database 115 used to track use of carrier networks by the access client.

In an embodiment in accordance with the present invention, the services provided by an access server are provided by a plurality of servers: an authentication server verifies user information when an access client attempts to access a carrier network; an update server provides software updates, access point database updates, login method updates, login token updates, and card driver updates; a Quality of Service (QoS) data collection server collects access client gathered QoS data; and an accounting server associated with the authentication server, gets accounting information for all connections used to determine billing. Each of the updater servers use the authentication server thus allowing user specific updates.

The access client stores network data and account management data in a data store including an access point database 116, a token database 117, a method database 118, and a quality of service database 120. The access point database includes information about access points that may be accessible to the access client. For example, a record in the access point database may include a signal or network identifier associated with a physical location identifier. For example, carrier network identifier such as a Service Set IDentifier (SSID) is used in Wireless Local Area Networks (WLANs) to identify the network to which an access point belongs. A physical location may be identified in terms of a coordinate system, such as a longitude and a latitude, or may be identified in terms of proprietorship, such as "Bob's Café", or by using map references, such as "corner of 4th and Main, Anytown USA, 12345". Other information about the access point may also be associated in the access point database such as whether or not the access client is authorized to access the carrier network or not. In addition, the access point database includes information about the signal types or protocol used by the carrier network. For example, whether the carrier network uses IEEE 802.11b as opposed to 802.11g as its protocol. In addition, the access point database associates appropriate business logic for the carrier network with the network identifier. For example, the access point might be for a carrier network that is owned by an entity that encourages free access to the carrier network. Other entities may require subscriptions or may allow access to the carrier network on a pay-per-use basis.

The token database is used to store tokens, such as passwords or logon identifiers, used by the access client to access individual carrier networks. The tokens may not have the same values or may not be in the same format as each individual carrier network may be owned by different entities that employ different access schemes. For example, an entity, such as a hotel, may own a carrier network and have its own way of accounting for access to the entity's carrier network including proprietary or unique logon protocols. As such, an access client may need to keep track of multiple sets of tokens used to access carrier networks owned by multiple entities.

The method database is used to store access methods, or simply methods, which are procedures that are used by the access client to access multiple carrier networks. These methods may be stored as programs that are interpretable or executable by the access client. For example, a scripting language may be used to specify how the access client is to access a carrier network. The access client parses the script to determine the steps necessary to gain access to a particular carrier network. As another example, a method may be stored as a precompiled executable that the access client loads into memory and executes in order to gain access to a particular carrier network.

The quality of service (QoS) database is used by the access client to store information about carrier networks and access points that the access client uses or attempts to use. For example, if the access client detects an AP but is unable to gain access to the APs associated carrier network because of some sort of communications error, the access client may store the error information in the QoS database for future processing.

Each of these databases coupled to the access client has a corresponding data store or database coupled to the access server. A master access point database 122 includes information about every access point that may be accessed by the access client. A master token database 124 includes tokens that may be used by the access client to access all of the carrier networks that may be accessible to the access client. A master method database 126 includes all of the methods an access client may need to access every carrier network that may be accessible to the access client. A master QoS database 128 includes information collected from the access client about the access points and carrier networks the access client has encountered.

Tokens can include more than just passwords. In addition, for each user, there can be more than one token, and the tokens can include more than one form of data. A single token, herein termed a "BASE" token, is used to access tokens used by an access client. The BASE token includes a user identifier set that uniquely identifies the user such as a username and an associated password. There can be many tokens that can include other types of information such as phone numbers, MAN or NIN, PIN codes, digital certificates, public keys, or private keys. In essence, any tuple that uniquely identifies a user or group of users may be included in a token. In this way, a user has to only deal with the BASE token, for example one username and password to unlock everything. In one embodiment of an access client in accordance with the present invention, the tokens are stored in an encrypted format in the token database.

In one access client in accordance with an exemplary embodiment of the present invention, the mobile computing device is operably coupled to a carrier network via a communications link adapted for communication using a wireless protocol such as IEEE 802.11b. The communications link may be established via a medium such as radio wave or infrared transmissions. The access client may access a plurality of carrier networks, such as carrier network 106*a* and carrier network 106*b*, that include a plurality of APs, such as AP 108*a* and AP 108*b*. Each of the carrier networks may have its own login methods and authentication tokens that the access client uses to access the network through the carrier networks. One skilled in the art of computer networks will recognize that access clients can be created in accordance with the present invention to access networks using other types of protocols such as all 802.11 base Ethernet technologies, including 802.11a, 802.11b and 802.11g and their derivatives, all cellular data technologies including WCDMA, CDMA, TDMA and GSM based data services including GPRS and EDGE, and other wireless data services including Ultra Wide Band.

The access client manages both the technical details of accessing a plurality of APs supplied by a plurality of carrier networks and the account management details needed to gain access to the plurality of carrier networks. To manage locating and coupling to an AP, the access client uses an access client AP database. The access client AP database includes details about the location and accessibility of APs. The access client receives periodic updates for the access client AP database via the access server. The access server maintains AP data in a network database. The AP data is obtained from carrier networks that are available to the access client. Once coupled to an AP, the access client accesses a network database in order to identify and logon to a carrier network.

The access client may provide ratings of APs and venues. For instance, if a landlord deploys wireless narrowband (<56 kbps) dialup connections into their venue, the access client "rates" the connection speed of the venue with an easily understandable user interface like green-yellow-red dots. Another way rating used is to rate an AP or venue on the reliability of the connection itself using an uptime metric of the AP.

To manage the account details of accessing a plurality of carrier networks, the access server is operably coupled to an account management database. The access server uses the account management database to track usage of carrier networks by the access client. Additionally, the access server uses the account management database to provide authentication for the access client as may be needed by the carrier networks.

The access server collects Quality of Service data from a plurality of access clients as the access clients connect to carrier networks through APs. The QoS data is used to determine the quality of carrier networks and individual APs. The QoS data may be used by a user of an access client to determine which APs should be used to establish a connection. Additionally, the QoS data may be used by carrier network operators to maintain the carrier networks.

The methods and tokens are shared across all types of mobile computing devices so that an access client uses a common description method and language that will work on any platform, such as a Personal Computer (PC), a Personal Digital Assistant (PDA), a phone, etc.

Once the access client has accessed the network, the access client may establish a Virtual Private Network (VPN) connection to the target server through the network.

Figure 2:
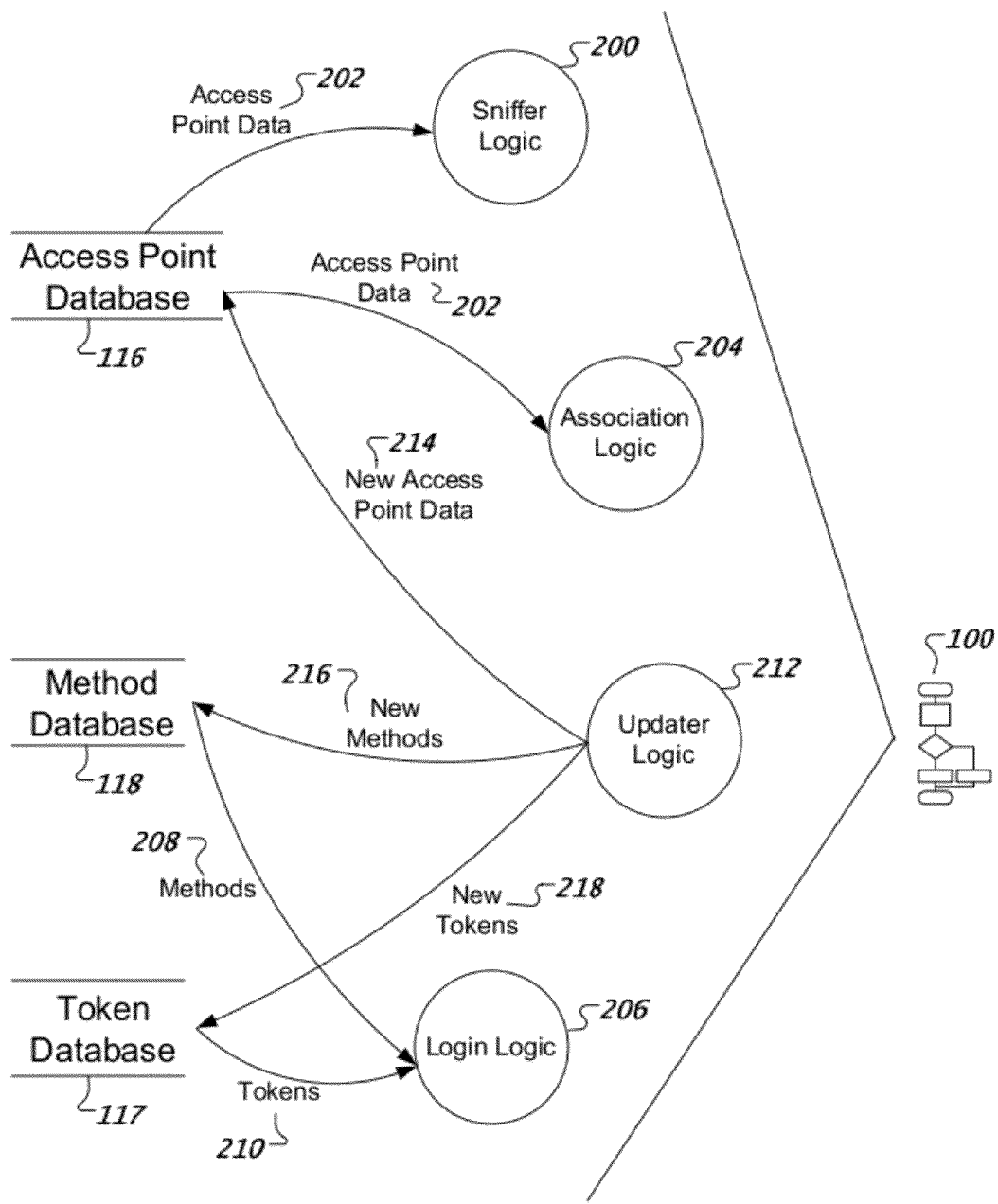
FIG. 2 is a data flow diagram illustrating access client databases and data processes for an access client in accordance with an exemplary embodiment of the present invention.

FIG. 2 is a data flow diagram illustrating access client databases and data processes for an access client in accordance with an exemplary embodiment of the present invention. An access client 100 may include separate software objects, sub-processes, or encoded logic that manage separate data manipulation and communication processes. In one access client in accordance with an exemplary embodiment of the present invention, an access client includes sniffer logic or sniffer 200, for detecting access points. The sniffer logic detects an access point by receiving carrier network signals transmitted by the AP. Included in the carrier network signals is a carrier network identifier used by devices coupled to the carrier network to identify the network. For example, the IEEE 802.11 protocol allows for the use of beacon packets to be transmitted by the AP. The beacon packet may specifically include the SSID of the carrier network in an easily identifiable location in the packet. As another example, the sniffer logic may receive packets transmitted from the AP and analyze the packets to determine the carrier network identifier. The sniffer logic is coupled to and uses an AP database 116 in order to obtain access point data 202 35 associated with the APs that the sniffer detects. For example, the sniffer may use the AP data to determine the physical location of the AP and display the physical location of the AP to a user.

Association logic 204 included in the access client receives access point data 202 from the access point database to associate the mobile computing device with the carrier network. Association of a mobile computing device entails establishing communication with the carrier network at the lower levels of a layered networking protocol. In an access client in accordance with an exemplary embodiment of the present invention, the access client is used to access carrier networks that may be described using the Open System Interconnection (OSI) seven layer model. The access client is able to make connection at all layers of the OSI model, but the connections are intercepted or disallowed by the access controller until the user is authenticated. So the access controller will block traffic traversing the access layer at layer 3 or above, or may even elect to block this traffic on layer 2. These restrictions are lifted after successful authentication.

Login logic 206 included in the access client receives previously described methods 208 and tokens 210 from a token database 117 and uses them to access carrier networks.

Updater logic 212 included in the access client updates the access point, method, and token databases using new access point data 214, new methods 216, and new tokens 218. The updater logic receives the new data from the previously described authentication database on an irregular basis.

In one access client in accordance with an embodiment of the present invention, the access client gathers information about a user's usage patterns, available AP signals, current associations and the user's preferences, account type, and account status, to determine which carrier network user should be connected to. This process is programmable and controllable by metadata describing relationships between the above-described information and makes signal offering decisions based on numerous pieces of information. In this way, an operator of a carrier network system incorporating a large number of carrier networks can create and enforce business logic specifying how an access client should access a network through a carrier network. In addition, a user may influence the business logic through the use of user preferences.

Figure 13:
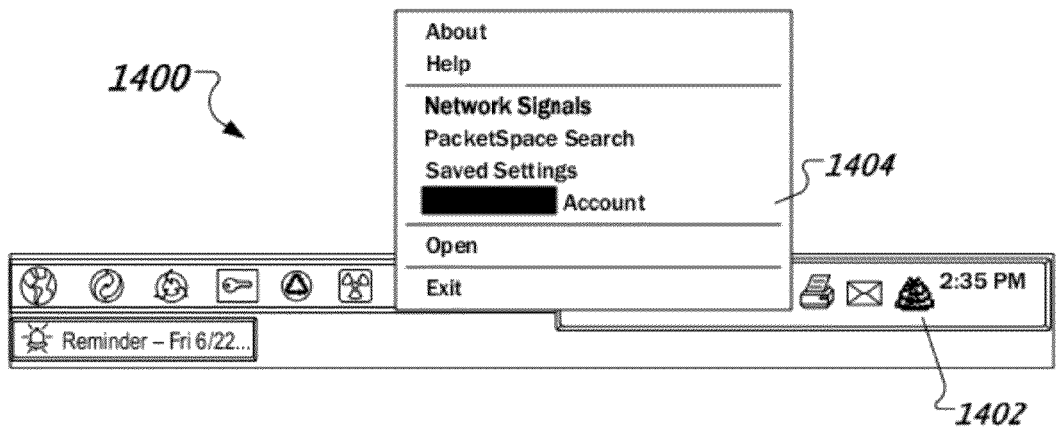
FIG. 13 is a portion of a user interface displaying connectivity information in accordance with an exemplary embodiment of the present invention.

FIG. 13 is a portion of a user interface displaying connectivity information in accordance with an exemplary embodiment of the present invention. In an access client in accordance with an exemplary embodiment of the present invention, the access client runs in the background on the mobile device without displaying a visible user interface. However, an access point icon 1402 displayed in a system tray shows that the access client is running in the background. The access point icon includes multiple visual states to show various information generated by the access client, such as connection status and wireless network card presence. If a user selects the access point icon, a short access client menu 1404 of options is displayed for the user allowing the user to launch directly primary sections of the access client application. Horizontal lines separate different functions to allow a degree of user error (e.g., the user won't accidentally close when they want to open).

The access client menu includes an "About" selection so that the user may determine version information and basic description of the access client. The access client menu further includes a "Help" selection to directly access an access client help tool. The access client menu further includes a "Network Signals" selection allowing direct access to a "Show Available Signals" network sniffer and selection user interface. This selection is bolded and is the default action when a user double-clicks on the system tray icon. The access client menu further includes an "Available Access Point Search" allowing direct access to an available access point search tool. The access client menu further includes a "Saved Settings" selection allowing direct access to an access client saved network settings and keys user interface. The access client menu further includes an "Account" selection allowing direct access to a "System Account" management user interface. The access client menu further includes an "Open" selection for launching an access client application window in full presentation/focus mode. Finally, the access client menu further includes an "Exit" selection to completely close the access client and all functionality, and remove the access client icon from the system tray.

In one access client in accordance with an exemplary embodiment of the present invention, a "connect" option is displayed when the access client is not connected to a carrier network and a "disconnect" option is displayed if the access client is connected to a carrier network. In another access client in accordance with an exemplary embodiment of the present invention, there is signal list here which shows the names of detected carrier networks and a colored dot indicating status next to the carrier network the access client is currently connected to.

In one access client in accordance with an exemplary embodiment of the present invention, if carrier networks signals from multiple operators in a carrier network system are available at once, the signals are aggregated and presented as one signal. In another embodiment, the signals are ordered in an order that is indicative of user preference as set forth in signal profiles that are user set-able. In addition, the signal profiles can be exported and imported, and the export files are cross-platform compatible.

Figure 14:
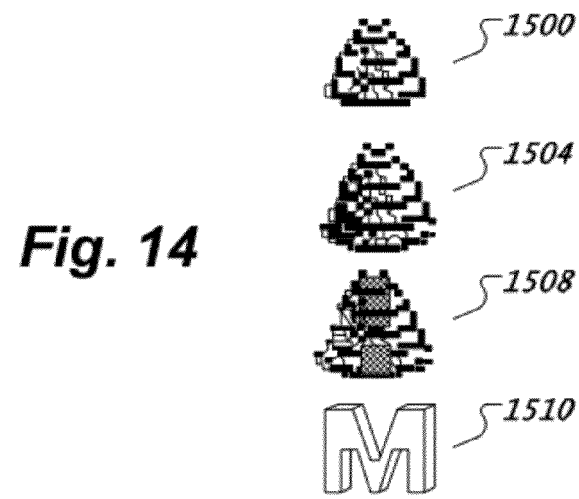
FIG. 14 is a portion of a user interface displaying signal strength information in accordance with an exemplary embodiment of the present invention.

FIG. 14 is a portion of a user interface displaying signal strength information in accordance with an exemplary embodiment of the present invention. The previously described access point icon may be displayed in a variety of ways by the access client in order to quickly convey to a user the state of a connection to a carrier network. In one access client in accordance with an exemplary embodiment of the present invention, the strength of the signal between the mobile device and an access point is displayed by increasing the size of the access point icon. A first access point icon size 1500 indicates a weak signal while a second access point icon size 1502 indicates a stronger signal.

In addition, additional shapes may be added to the icon, or the icon may be replaced entirely, to indicate different states of the connection. For example, an exclamation point 1506 may be added to the access client icon to indicate that the access client is functioning but cannot find a networking device coupled to the mobile computing device. As another example, the icon may be replaced with another icon 1508 to indicate that the access client can find a networking device coupled to the mobile computing device, but the access client does not detect an access point.

In one embodiment of an access client in accordance with the present invention, icons are changed depending on the co- or re-branding of the carrier networks. For example, a carrier network may be identified by a trademarked symbol and the trademarked symbol is used as the icon. In another embodiment, the icon is a signal strength meter.

In one embodiment of an access client in accordance with the present invention, connection or signal availability status is shown for selected or active devices. For example, a computer may have 2.5G, 802.11 and other connectivity options, and the icon is switched to reflect the most desirable or most relevant active option.

Figure 15:
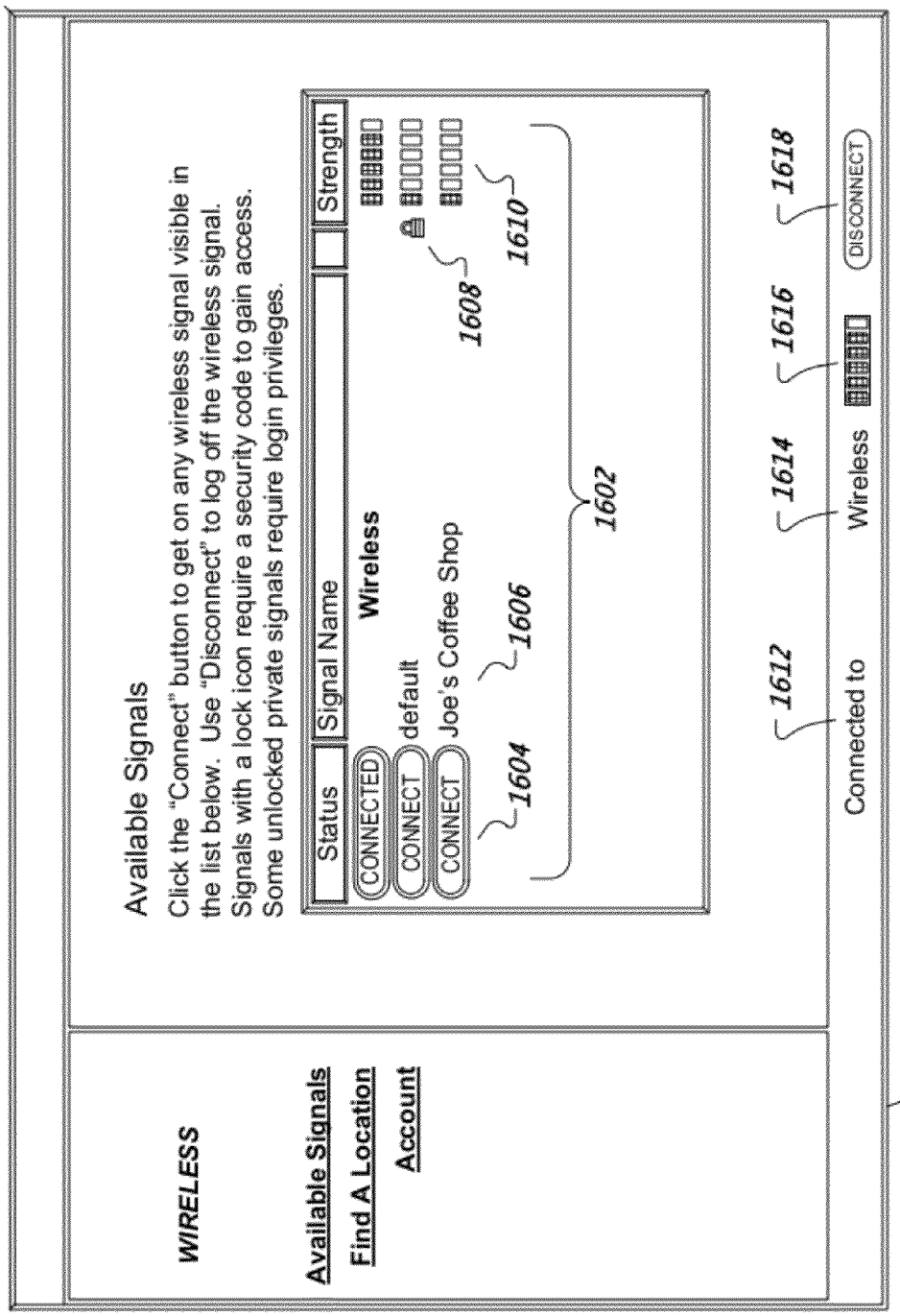
FIG. 15 is a portion of a user interface displaying access point availability information in accordance with an exemplary embodiment of the present invention.

FIG. 15 is a portion of a user interface displaying carrier network availability information in accordance with an exemplary embodiment of the present invention. An access client uses an access point availability user interface 1600 to indicate to a user that carrier networks are available for use in connecting to a network. The user interface includes a carrier network list 1602 listing carrier networks with access points in range of the mobile computing device. Carrier network are sorted in the list by signal strength of their associated access points. The list includes a plurality of columns. A carrier network connect/disconnect graphic column 1604 includes a Connect/Connected" graphic indicating whether or not the mobile computing device is currently connected to the listed carrier network. If the graphic indicates that the carrier network is not being used, selecting the graphic will connect the mobile computing device to the carrier network. A carrier network name column 1606 displays a carrier network identifier or ssid. In some cases, an entity that deployed the carrier network may belong to an organization of other carrier networks, in which case the name of the carrier network will be replaced by the name of the organization. An access point signal strength column 1610 includes a dynamic graphic of bars representing signal strength. A carrier network locked/unlocked column 1608 includes a graphic indicating whether or not the carrier network is protected by security measures such as encryption.

A user may view more technical details about each carrier network by highlighting (single-clicking) the carrier network and selecting "Details". The following information will then be available to the user in a user interface that pops up. A display name of the carrier network, an actual SSID for the carrier network, a Media Access Control (MAC) address for the access point, a channel value, a security setting for the carrier network, and a carrier network type.

The carrier network availability user interface further includes a connected carrier network portion 1612 for display of a name for a carrier network that the mobile computing device is currently connected to, a carrier network access point signal strength indicator 1616, and a carrier network disconnect button 1618. A user may select the carrier network disconnect button to disconnect the mobile computing device from the carrier network.

In a carrier network availability user interface in accordance with an exemplary embodiment of the present invention, the display of available carrier networks is modified based on the preferences of a user. For example, a preferred network may always be displayed before all other carrier networks. As another example, a particular carrier network may be deleted from the list so that the carrier network is never displayed as a possible connection. As another example, a user may be affiliated with a billing entity that monitors connection time to particular carrier networks in order to properly bill the user for connections made to the carrier networks. In this case, the user may want the particular carrier networks also associated with the billing entity to be displayed first in a list of available carrier networks.

In a carrier network availability user interface in accordance with an exemplary embodiment of the present invention, there can be shown different lock symbols indicating the type and security levels of different network protocols. For example, a lock symbol for a VPN enabled network can be one color with another color to indicate that WEP, 802.1x, or another security system is used to encrypt data transferred over a wireless link similar to the lock in the previously describe sniffer display.

In a carrier network availability user interface in accordance with an exemplary embodiment of the present invention, a details section changes depending on the connection type for the carrier network. For example, a 2.5G carrier will probably not show an SSID, rather the network carrier associated, NAP connected, or NAP information is shown.

Figure 3:
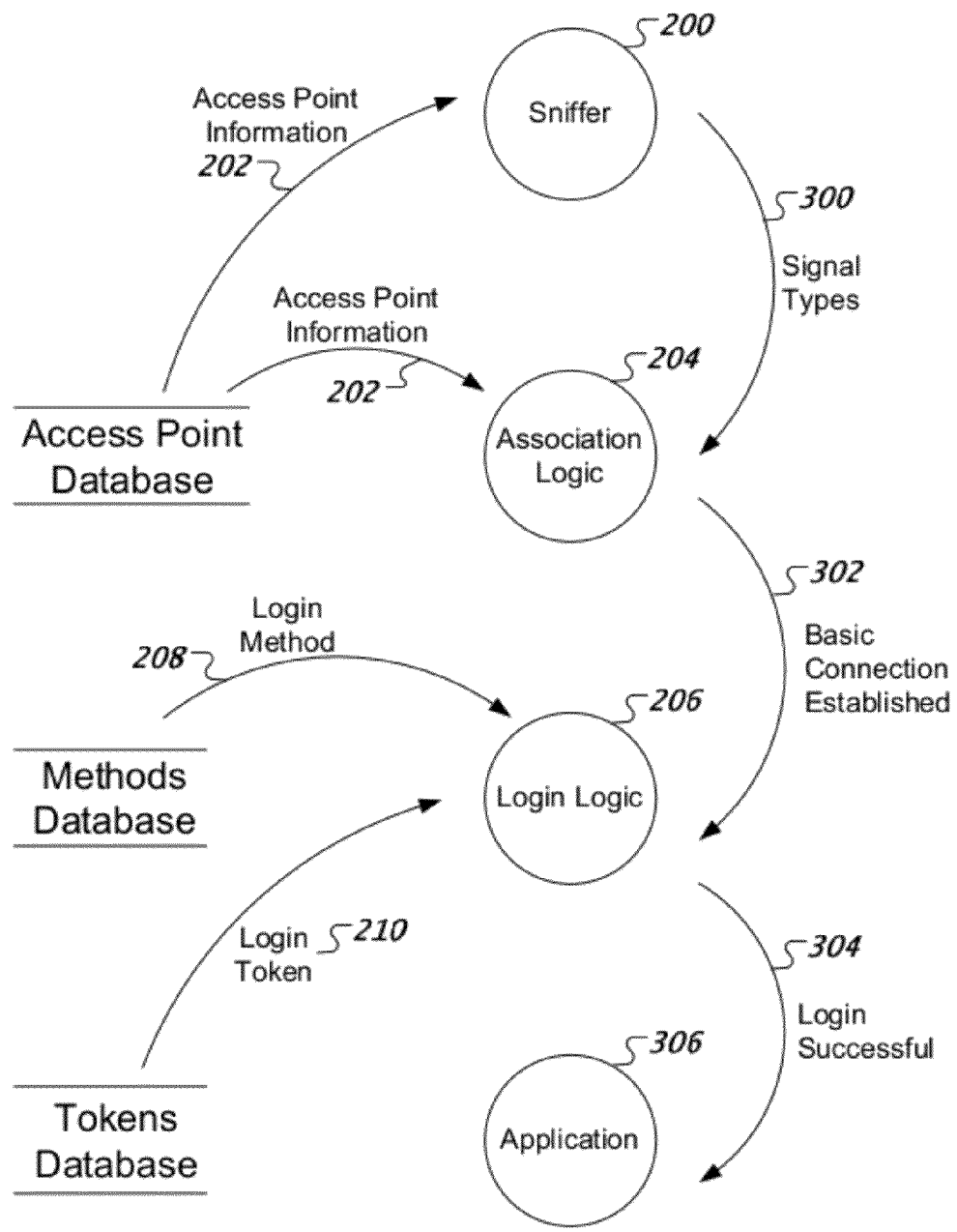
FIG. 3 is a data flow diagram of the interaction between data processes in an access client in accordance with an exemplary embodiment of the present invention.

FIG. 3 is a data flow diagram of interactions between data processes in an access client in accordance with an exemplary embodiment of the present invention. Sniffer logic 200 included in an access client continuously sniffs (300) for carrier network transmissions looking for access points. The sniffer does so by receiving transmitted signals and determining if they are carrier network signals that are being transmitted by an access point, such as a previously described beacon packet. When the sniffer detects carrier network signals, it attempts to determine a network identifier, such as a previously described SSID, using the carrier network signals. Using the carrier network identifier, the sniffer gets access point data from an access point database 116. The sniffer uses the access point data to generate the displayed portions of the previously described user interfaces. The sniffer also uses the access point data to determine if the access point belongs to a carrier network to which the access client may have access to. If so, the sniffer determines that it has detected a carrier network 301 and transfers control to network association logic 204 included in the access client.

The association logic uses the network identifier to get access point data 202 from the access point database 116. The access point data includes data about what protocols are used by the carrier network detected by the sniffer logic. The association logic uses the access point data to establish a basic connection to the carrier network as previously described. Once the basic connection has been established, the association logic transfers control to login logic 206 included in the access client.

The login logic uses the network identifier to get an appropriate method 208 from a method database 118 and appropriate token or tokens 210 from a token database 117. The login logic uses the method and the tokens to negotiate with an access controller, such as access controller 110*a* of FIG. 1, for access to the detected carrier network. For example, the access controller may require the login logic to submit a login identifier for the access client and a login password and then wait for an acknowledgment from the access controller that the access client has been authorized to access the detected carrier network. In another access client in accordance with an exemplary embodiment of the present invention, the access client includes an access client identifier that may be transmitted to the access controller. The access controller transmits the access client identifier to the access server. The access server uses the access client identifier to identify the access client and determine if the access client is authorized to access the carrier network. If so, the authorization server transmits an authorization acknowledgment to the access controller and the access controller admits the access client to the carrier network. Once the login logic has successfully logged the access client on (304) to the carrier network, an application 306 hosted by the mobile computing device may use the carrier network to access another network, such as network 104 of FIG. 1, via the carrier network.

Figure 12:
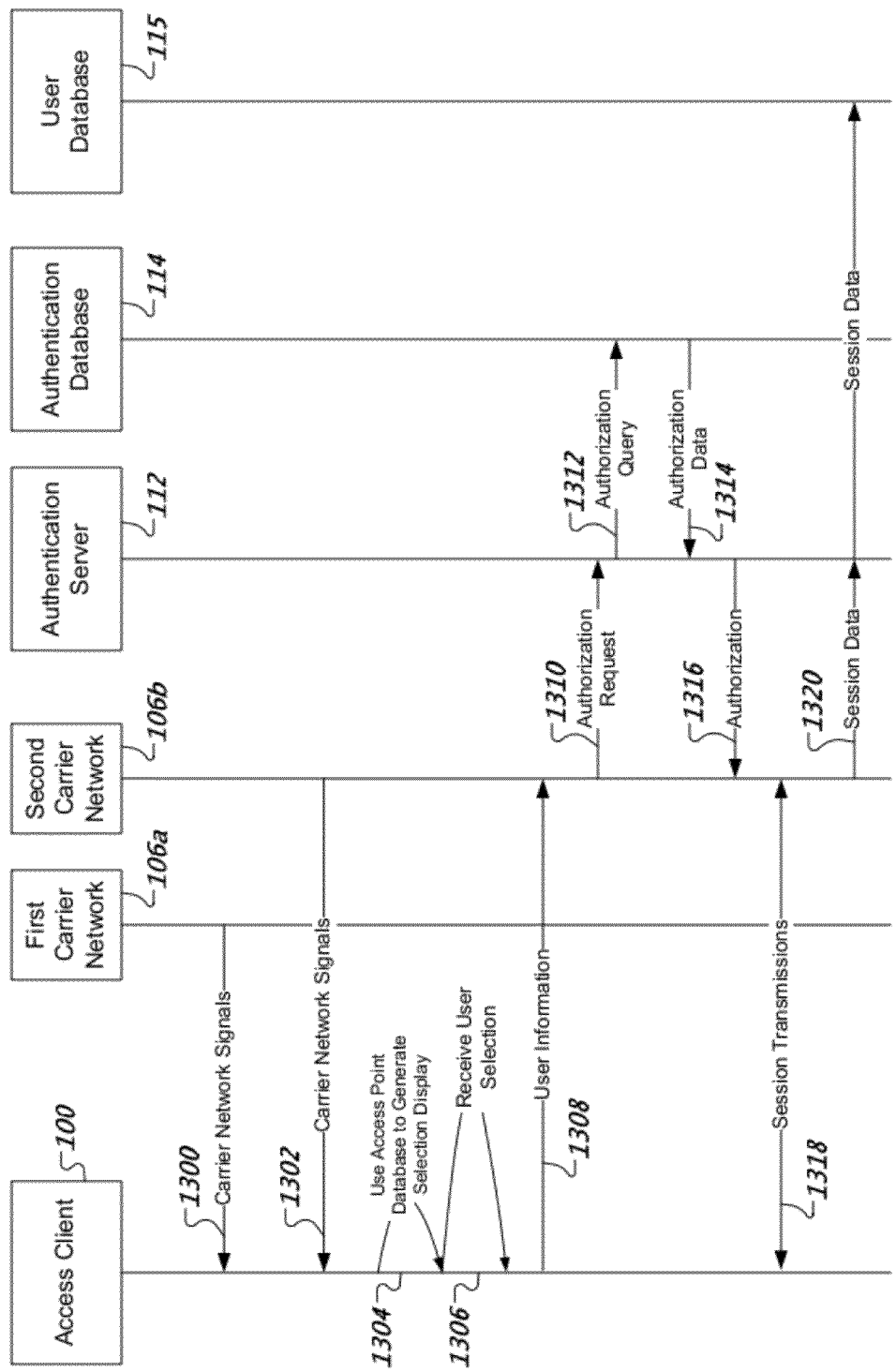
FIG. 12 is a sequence diagram of an access client accessing a carrier network in accordance with an exemplary embodiment of the present invention.

FIG. 12 is a sequence diagram of an access client accessing a carrier network in accordance with an exemplary embodiment of the present invention. An access client 100 receives first carrier network signals 1300 and second carrier network signals 1302 from a first carrier network 106*a* and a second carrier network 106*b* respectively. The access client uses the received carrier network signals along with an access point database (not shown) to generate (1304) a selection display for use by a user in selecting which carrier network to access. The access client receives (1306) a user selection of a carrier network, such as a selection for the second carrier network. The access client then transmits user information 1308 to the selected carrier network. In response, the selected carrier network transmits an authorization request 1310 including the user information to an access server 112. The access server uses the authorization request to generate an authorization query 1312 for an authentication database 114. In response to the authorization query, the authentication database returns authorization data indicating whether or not the access client and its associated user may access the carrier network. If the access client and its associated user are authorized for the carrier network, an authorization message 1316 is transmitted by the access server to the selected carrier network. The carrier network then allows the access client to connect to the carrier network and transmit and receive session data 1318 through the selected carrier network. The selected carrier network may collect session data 1320 on the user's access to the selected carrier network and transmits the session data to the access server which stores the session data in a user database 115 for use in billing the user for accessing the carrier network.

Figure 4:
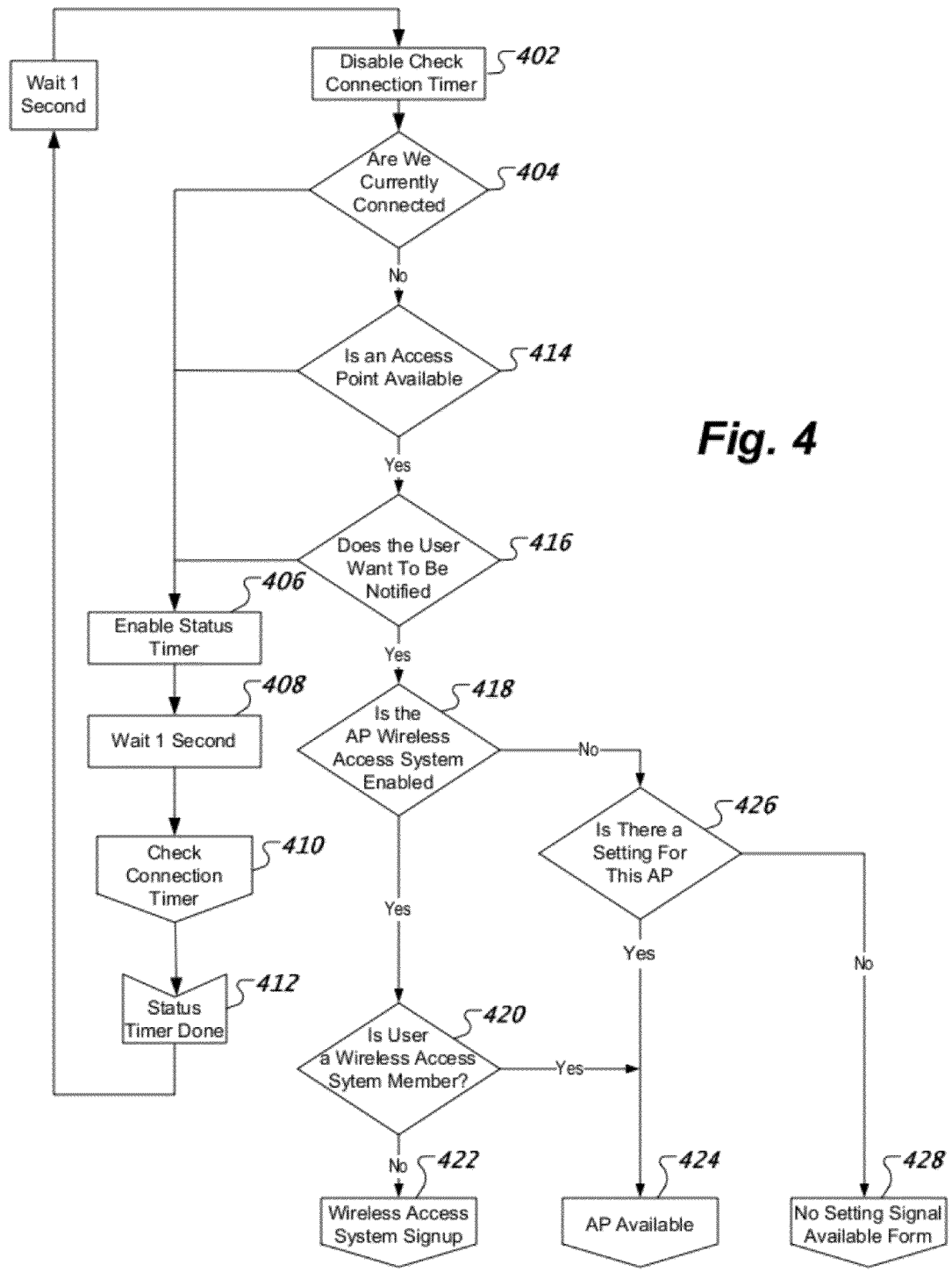
FIG. 4 is a process flow diagram for a sniffer in accordance with an exemplary embodiment of the present invention.

FIG. 4 is a process flow diagram for portions of sniffer logic in accordance with an exemplary embodiment of the present invention. Sniffer logic for an access client continuously polls access points that the sniffer logic can detect. To do so, the sniffer logic disables 402 a check connection timer and determines (404) if the access client is currently connected to a carrier network. If yes, the sniffer logic enables (406) a status timer and waits (408) if the access client is currently connected to a carrier network. If yes, the sniffer logic enables (406) a status diner and waits (408) one second before displaying (410) the status of the connection. After the sniffer logic is done (412) displaying the status of the connection, the sniffer logic waits (413) an additional second before resuming operation.

If the sniffer logic determines (404) that the access client is not currently connected to a carrier network, the sniffer logic determines (414) if an access point is available. If not, the sniffer logic continues displaying the status of the connection. If an access point is available, the sniffer logic determines (416) if the sniffer logic should notify a user of the access client that an access point is available. If not, the sniffer logic continues displaying the status of the connection. If it is determined that the sniffer logic should notify the user, the sniffer logic determines (418) if the access point is associated with a carrier network that is wireless access system enabled. The sniffer logic does so by consulting a user managed signal profile store and the previously described AP database. If so, the sniffer logic determines (420) if the user is a member of the wireless access system. If the user is not a member, the sniffer logic transfers control to a wireless access system sign up process 422 so that the user may be prompted to become a member of the wireless access system. If the user is a member of the wireless access system, the sniffer logic indicates (424) that an access point is available and transfers control to previously described association logic 204 of FIG. 2.

If the sniffer logic determines (418) that a detected access point is not part of a wireless access system, then the sniffer logic determines (426) if the access point database includes access point data including settings for the access point. If so, the sniffer logic indicates (424) that an access point is available and transfers control to previously described association logic 204 of FIG. 2. If the sniffer logic cannot determine how to use the access point, the sniffer logic indicates (428) that no access points are available.

In sniffer logic in accordance with an exemplary embodiment of the present invention, the sniffer logic may switch between preferred carrier networks even after the access client has accessed a carrier network. For example, if the access client is already connected, the sniffer logic may detect a signal from a more preferable carrier network. Then, based on business logic and user preference, access client determines whether or not to switch connections to the preferred carrier network.

The detected carrier network signals may include carrier network information in different formats as dictated by the type of carrier network transmitting the carrier network signals. For example, in the case of a Wireless Wide Area Network (WWAN), such as a Wideband Code Division Multiple Access (WCDMA), Code Division Multiple Access (CDMA), General Packet Radio Service (GPRS), or Enhanced Data for GSM Evolution (EDGE) network, the access client uses carrier network identification information and carrier network service parameters broadcast by the carrier network, including a carrier identifier and association preference, to determine whether the user is a member of the carrier network system and can access the carrier network.

Figure 5:
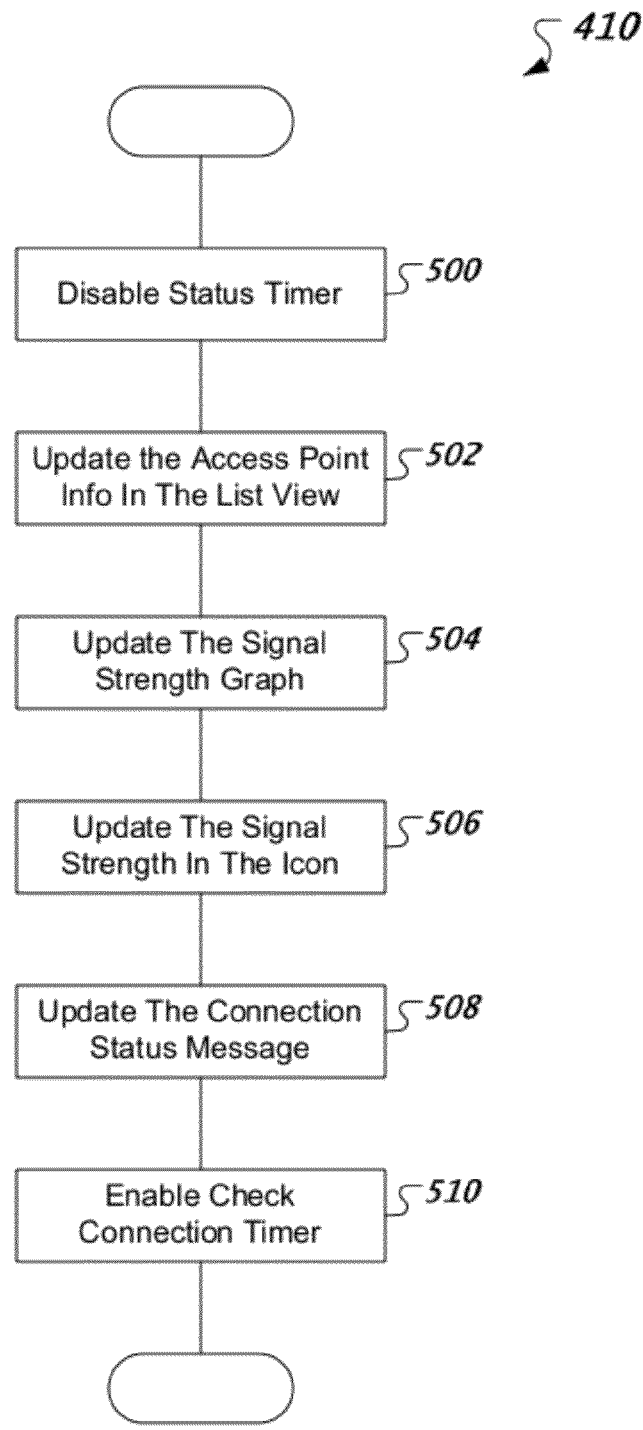
FIG. 5 is a process flow diagram of a status timer process for a sniffer in accordance with an exemplary embodiment of the present invention.

FIG. 5 is a process flow diagram of a check connection process for sniffer logic in accordance with an exemplary embodiment of the present invention. The status timer process checks the status of a connection and updates display portions of the previously described user interfaces so that a user may be informed about the availability and quality of a connection. The check connection process disables (500) a status timer so that the check connection process won't be interrupted while it is updating the display portions. The check connection process uses access point data from the previously described access point database to maintain and update (502) a previously described list of available carrier networks displayed to the user. The check connection process determines the strength of the connection signal and updates (504) a previously described signal strength graph displayed to the user. The check connection process further updates (506) the previously described access point icon and updates (508) the previously described carrier network connection status display. Finally, the check connection process enables (510) a check connection timer.

Figure 6:
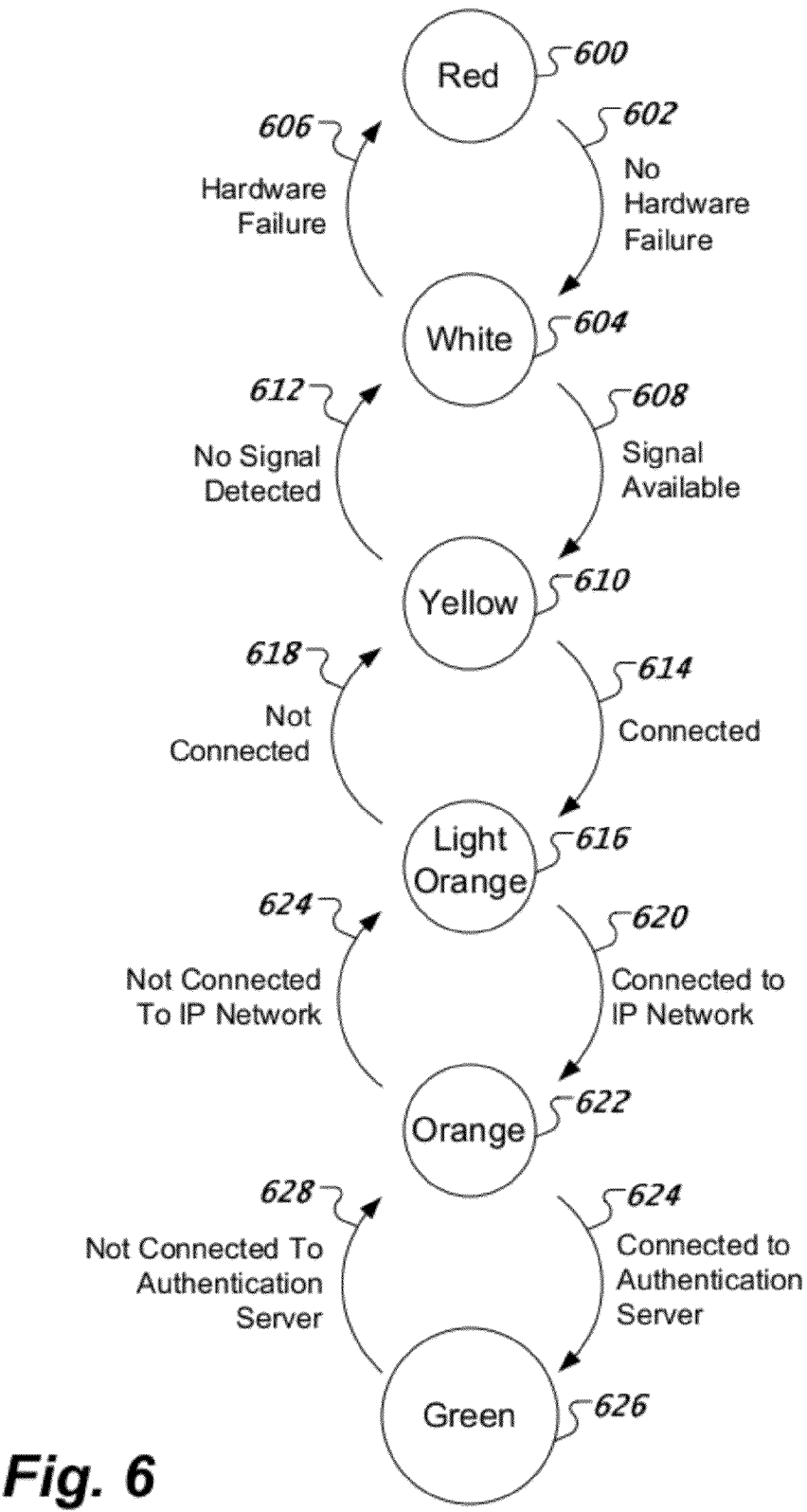
FIG. 6 is a data flow diagram of a stateful connection process in accordance with an exemplary embodiment of the present invention.

FIG. 6 is a data flow diagram of a stateful connection process in accordance with an exemplary embodiment of the present invention. As previously described, the access client maintains an access point icon indicating the state of a connection to a carrier network. The access client indicates the strength of an access point signal by adjusting the size of the access point icon. The access client may also use the color, shading, or overall shape of the access point icon to indicate the quality of the connection. In an access client in accordance with an exemplary embodiment of the present invention, the access client indicates the quality of a connection using a plurality of colors or shades of colors. The access client uses a first color 600, namely red, to indicate that the access client has detected a hardware error. If the access client determines (602) that the hardware is functioning properly but no carrier network signal is detectable, the access client sets the color of the access point icon to a second color 604, namely white. If the access client detects (606) that there is a hardware failure, the access client resets the color of the access point icon back to the first color.

If the access client determines (608) that there is a carrier network signal available, the access client sets the color of the access point icon to a third color 610, namely yellow. If the access client determines (612) that the carrier network signal is lost, it resets the access point icon color back to the second color.

If the access client determines (614) that the access client is connected at a low level with a carrier network, the access client changes the access point icon color to a fourth color 616, namely light orange. If the access client determines (618) that the low level connectivity is lost, the access client resets the access point icon's color to the third color.

If the access client determines (620) that the access client is connected to a network outside of the carrier network, the access client sets the color of the access point icon to a fifth color 622, namely orange. If the access client determines (624) that the access client has lost contact with the network, the access client sets the color of access point icon back to the fourth color.

Once the access client is connected to a network, it attempts to connect to the previously described access server. If the access client determines (624) that the access client is connected to the access server, the access client sets the color of the access point icon to a sixth color 626, namely green. If the access client determines (628) that the access client is no longer connected to the access server, the access client resets the color of the access point icon to the fifth color.

In an access client in accordance with an exemplary embodiment of the present invention, the access client exchanges connectivity messages with the access server. The access client generates a connectivity message including randomized content. The access client transmits the connectivity message to the access server. The access server receives the connectivity message and extracts the randomized content. The access server generates a connectivity response by performing a transformation using the randomized content. The access server then transmits the results of the transformation to the access client. The access client performs the same transformation of the randomized content and compares the access client's transformation results to the transformation results received from the access server. If the transformation results generated by the access client and the access server are the same, the access client may conclude with a high probability that the access client is still coupled to the access server. This process reduces the possibility that a router may successfully spoof the access client into believing that the access client is coupled to a network through a carrier network.

In an access client in accordance with an exemplary embodiment of the present invention, transition 624 happens after a successful authentication in the case of a for-pay carrier network that requires a login, after the access client has completed an enhanced status check to verify that the access client can reach a wide area network. In the case of a private network, this transition happens when the access client can couple to an access server on the network. In this case, transition 628 happens in reverse, for example when the access client no longer sees the access server on the private network or can no longer reach the wide area network on a for-pay carrier network.

In other stateful connection processes in accordance with an exemplary embodiment of the present invention, simplified coloring schemes are used with a reduced number of states. For example, only two states may be used, with green indicating full connectivity and red indicating any condition less than full connectivity.

Figure 7:
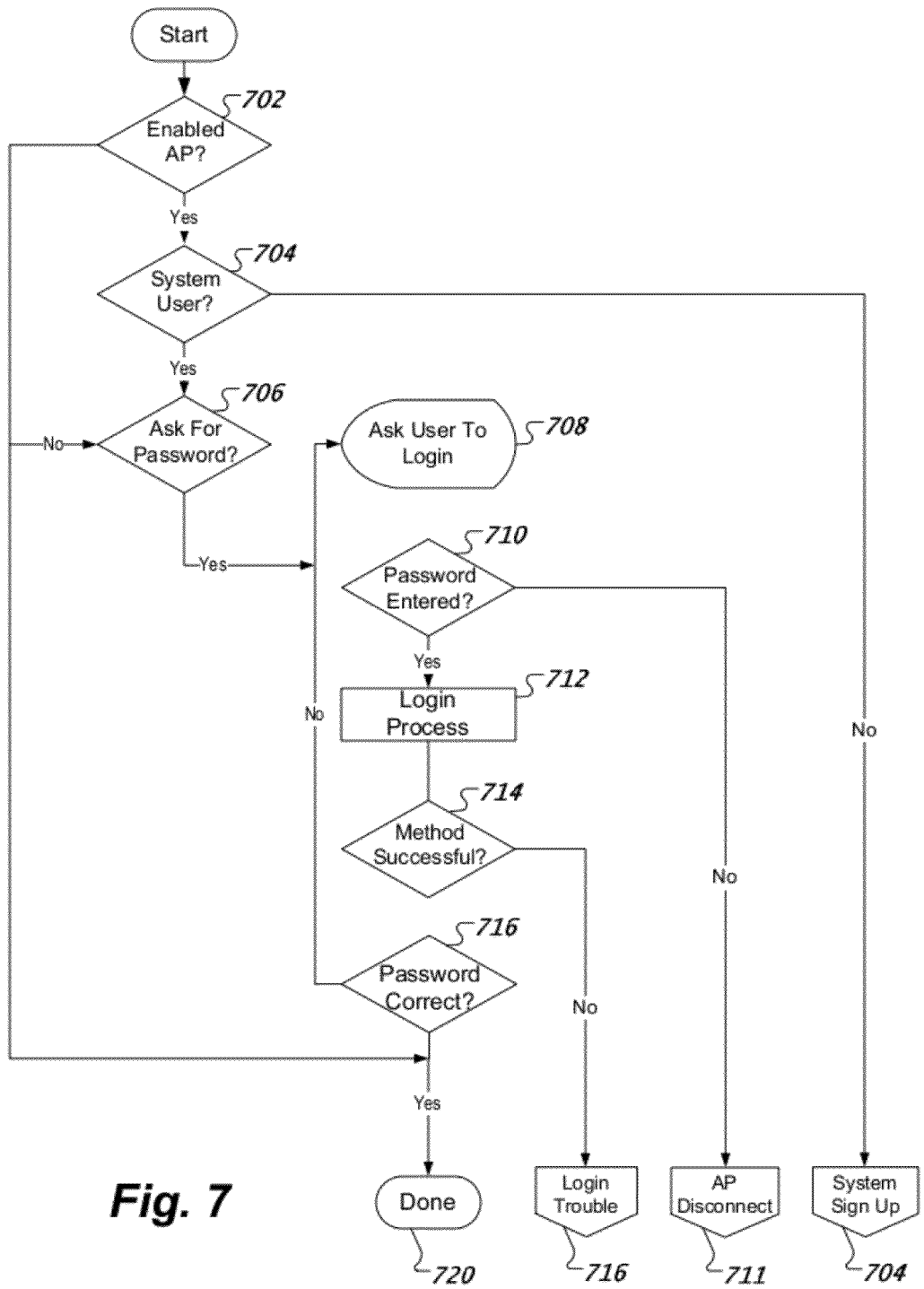
FIG. 7 is a process flow diagram of an access point user interface in accordance with an exemplary embodiment of the present invention.

FIG. 7 is a process flow diagram of a carrier network login user interface process in accordance with an exemplary embodiment of the present invention. In an access client in accordance with an exemplary embodiment of the present invention, the access client is used by a user to gain access to a plurality of carrier networks owned by separate entities. The user's use of the carrier networks is facilitated by organizing the carrier networks into a single carrier network system. The access client serves as a mediator between the user and the carrier network system by managing separate login methods and login tokens required to access the carrier networks. In this case, the user perceives that the carrier networks belong to a single carrier network system to which the user has access rights. As the mediator, the access client confirms that the user has access rights to the carrier network system and also confirms that individual carrier networks belong to the single carrier network system.

To connect to a network through a carrier network, a carrier network login user interface process 700 confirms (702) that an access point detected by the sniffer belongs to a carrier network belonging to the carrier network system. If not, the carrier network login user interface process does not attempt to log the user on to the carrier network. If the access point does belong to a carrier network belonging to the carrier network system, the carrier network login user interface process determines (702) if the user attempting to access the carrier network system is a subscriber to the carrier network system. If not, the carrier network login user interface process directs the user to a 20 carrier network system sign up process. If the user is a subscriber, the carrier network login user interface process determines (706) if it needs a password from the user in order to log the user onto the carrier network to which the detected access point belongs. If the carrier network login user interface process determines it does need a password, such as when accessing a for-pay carrier network, the carrier network login user interface process prompts (708) the user for a password. If the carrier network login user interface process determines (710) that the user has refused to enter a password, the carrier network login user interface process disconnects (712) from the access point. If the carrier network login user interface process determines that the user has entered a password, the carrier network login user interface process calls carrier network login process (712) to perform the actual login. The entered username and password are stored in the previously described BASE token. The username and password are verified and used to unlock the token set. The method then picks whatever tokens and information it needs to authenticate the access client to the network. As such, a user will only need one known user identifier set that uniquely identifies the user, such as a username and password, to communicate with the access client. In turn, the access client uses the user identifier set to get tokens including other user identifier sets to authenticate itself with the carrier network. In addition, the access client may use a one-time password, or a certificate, or anything else the access client might need to logon to the carrier network, all without exposing the details of the implementation to the user. For the user, it is always one dialog, one user identifier set or identifier, and the access client takes care of the rest of the work, transparently to the user.

If the carrier network login user interface process determines (714) that the carrier network login process generated an error because. there was an error in a login script or method, the carrier network login user interface process generates a login trouble report 716. If the carrier network login user interface process determines that the login script was successful, the carrier network login user interface process determines (716). If the password was correct, the carrier network login user interface process prompts (708) the user for another password to try. If the login script executed successfully and the password is correct, the carrier network login user interface process concludes 720.

While the preceding examples describe a processes using usernames and password and Web-based logins, other access protocols may be supported as well. In effect, other authentication schemes either from within the access client, or using external authentication providers by be implemented. The access client serves as a mediator, with the methods telling the access client how to authenticate itself and the tokens telling the access client what data to use while doing so. Examples of other methods supported include SIM based authentication, 802.1x based authentication, 802.11i based authentication, Web-based authentication, EAP, PEAP, WPA/SSN and essentially any other forthcoming standard. The access client is a generic engine that can either directly drive the access protocols for these standards, be extended to directly drive the access protocols for the standards, or use external supplicants or software or operating system components to drive the access protocols for any standard.

Figure 8:
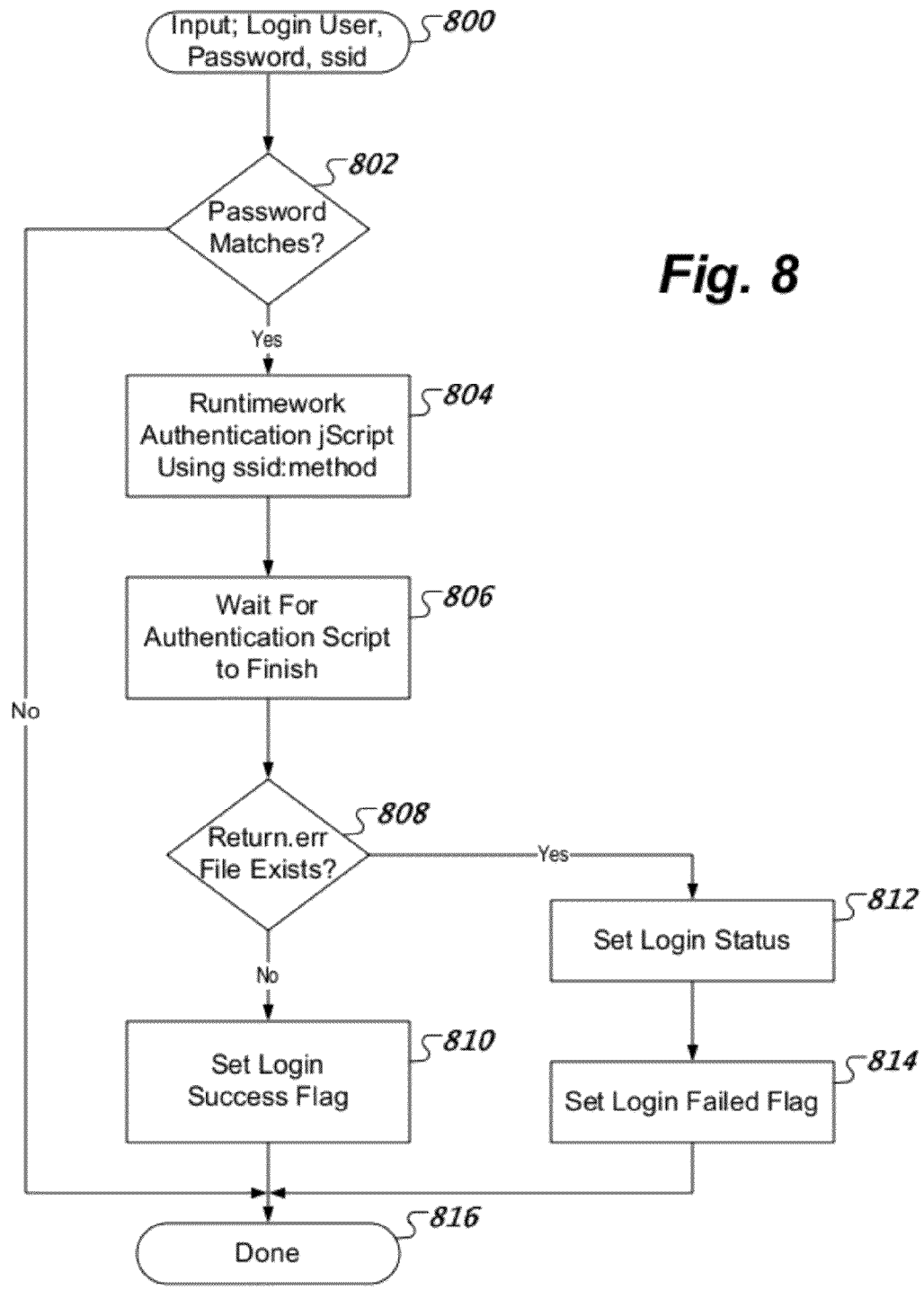
FIG. 8 is a process flow diagram of an access point login process in accordance with an exemplary embodiment of the present invention.

FIG. 8 is a process flow diagram of a carrier network login process in accordance with an exemplary embodiment of the present invention. A carrier network login process 712 is invoked (800) and accepts as input a user identifier, a password, and a SSID corresponding to the carrier network that a user is attempting to access. If the password given by the user matches (802) a system password, the carrier network login process executes (804) a login script or method associated with the carrier network and waits (806) for the login script to finish. When the script is finished, the carrier network login process determines (808) if an error file was generated by the login script. If not, the carrier network login process sets (810) a login success flag. If an error file exists, the carrier network login process sets (812) a login status flag and sets (814) a login failed flag. After setting the appropriate flags, the carrier network login process concludes (816).

In a carrier network login process in accordance with an exemplary embodiment of the present invention, if the password given by the user does not match (802), the login process will invoke a method and token update with the password the user just entered. If the update succeeds, the login progress will continue by executing (804) a new login script or method and token associated with the carrier network. If the login process still fails, the user is prompted with a failed password dialog.

FIG. 16 is a method script in accordance with an exemplary embodiment in accordance with the present invention. The method script is used in a previously described carrier network login process to login onto a carrier network. The method script is written in the JavaScript programming language and is intended for a mobile computing device having Component Object Models (COM) enabling programmers to develop software objects that can be accessed by any COM-compliant application. The method script invokes COM software objects included in an 15 access client. The interfaces for the COM objects are as follows:
token—
  methods
    load(string name)—load a given token, identified by "name".
  properties
    Username—a string for a user name
    Password—a string for a password
    realm—a string for a realm
http, https—
  methods
    getUrl(string fullUrl, string username optional, string password optional, string realm optional)—fetch's a given Uniform Resource Locator (URL) and populates a local state with it.
    PostUrl (string fullUrl, string username optional, string password optional, string realm optional)—posts to a given URL. A variable called "postvariables" is populated with the post values before using the method.
    AddPostVariable(string name, string value)—adds a variable to be posted in a later call to PostUrl.
    ClearPostVariables( )—clears all post variables.
  properties
    Response—gets a response given by a server in response to the post. Returns an object that has a single string property=HTML, and a single method GetFormValue (string formName, string formVariableName) that returns a string value for a form variable.
return—
  methods
    Error (string msg)—"msg" is an HTML document to return to the user. This property is set when an error occurs. Setting an error halts execution of a method. "msg" is written to an error file.
    success (void)—ends the script and deletes the error file.
    exception (void)—something bad has happened, the method then writes a static error msg to the error file.
error—
  property:
    number—the error number, if there was one, 0 if there was no error.

In the exemplary method script, the method script first attempts to obtain authentication directly from a previously described access server. If the authentication is not directly available from the access server, the method script attempts to be authenticated by an access controller using access data transmitted by the access server in response to the authentication request. The method script instantiates (1700) a token object, a http object, a https object, a return object, and an error object. The method script then initializes (1702) the token, https, http, and return objects. The method script loads (1704) a token from the previously described token database with then name of "basic". The method script gets (1706) a document indicated by the URL "www.accessserver.com" using the token information. The method script gets (1708) a resultant response and if the length of the response is less than 1, then the method script returns (1710) while indicating a successful access of a carrier network.

If a response is returned, then the method script must continue processing by parsing (1712) the response given by the access server and using the parsed response to build (1714) a query string that will be transmitted to an access controller as part of a post. The method script adds (1716) the query string, adds (1718) a user name, and adds (1720) a password to post variables to be used by an https post process. The method script then transmits (1722) the post variables to the access controller. The method script receives (1724) the access controller's response and parses (1725 and 1728) the response looking for error messages. If a particular error message is found, the method script sets (1726 or 1728) appropriate error messages. If an error occurs, the software objects instantiated by the method script throw exceptions which are caught (1730) by the method script and processed as appropriate. If no errors have occurred, the method script uses the return software object's success method to indicate a successful execution of the method script and access of a carrier network.

As previously described, token properties include other options, such as certificates and other attribute/value pairs. The architecture of the access client enables the access client to support extensions to the methods and tokens such as interfaces to the other authentication methods described above such as 802.1x and WPA using EAP and PEAP. As a method script is written in a general purpose programming language, many different things may be accomplished in a script and the script described above is only an example.

FIG. 17 and FIG. 18 are portions of an extensible markup language document in accordance with an exemplary embodiment of the present invention. Method scripts written in eXtensible Markup Language (XML) may be easily transported using a network such as the Internet. XML based methods and tokens are used by the access client to request authentication and gain access to carrier networks maintained by various entities. Authentication information used by an access client may be divided into two parts, methods and authentication tokens or simply tokens. Methods are generalized descriptions that tell the access client how to authenticate itself with the carrier network, without giving specifics as to the exact username, password or other user-specific variables to use. Rather, a method has references to an authentication token, which includes individual information about the user for which the authentication token is intended, such as the username and password to use with a specific carrier network. Most access clients, or at least a large group of access clients, share methods, whereas authentication tokens are individually set on a per-user basis.

Methods are defined by specifying: a method name; a protocol to use to authenticate with a carrier network; a reference to an authentication token to use to fill in fields in the method that require an attribute; and actions to take in order to authenticate the access client in the form of a script that includes the exact steps to take while using the protocol. Method information is exchanged between the back-end systems coupled to the access server and the access client in XML format.

A method name describes a unique identifier for a method. This is the name by which the method is referred to in the access point database or the carrier network's access controller's authentication web page. Each method has one method name, which may not be blank. Within an authentication method database, methods are unique. There is one special method name, "DEFAULT", which is the method used in case no matching methods are found for a particular authentication challenge. Methods that have no name are not referenced and are not be stored on the access client. Methods that are interactively retrieved which do not have a method name are also ignored.

Each method is defined in a set of <AUTHMETHOD> tags with the method name specified using a NAME attribute in a start tag. For example, "<AUTHMETHOD NAME="DEFAULT1I>" defines a method with the name of "DEFAULT".

Protocols supported include HTTP, HTTPS, WPA, 802.1x, 802.1i and various flavors of EAP and PEAP, including PAP, MS-CHAP, MS-CHAPv2, TLS, and EAV. A protocol may be specified for a method at any time. When a first method is initiated, a protocol is selected as HTTPS by default. The selected protocol is stored in an environmental variable which is globally accessible to any process running on the access client. The protocol may be redefined using a pair of <PROTOCOL> tags which surround the name of the protocol to be used. For example, "PROTOCOL>HTTPS</PROTOCOL>" defines the protocol to be used as "HTTPS". Each method may have any number of <PROTOCOL> tags in the method's body which are executed sequentially. The active protocol is stored in the environmental variable PROTOCOL, which can be used for evaluation purposes. This variable may only be modified through the <PROTOCOL> tag. In the case where setting the environmental variable fails, an ERROR environmental variable is set with an appropriate error code.

A method makes reference to a name of an authentication token to use which is retrieved from an authentication token database. Each method may have any number of authentication token references. When a first method is initiated, the authentication token is set to BASIC by default. The selected token is stored in the environment. If a token is referenced that is not known, the BASIC authentication token is used. If a field is referenced that does not exist in the current token, the same field will be looked up in the BASIC token and substituted. If the requested attribute is not present in the BASIC authentication token, a blank value is returned. An authentication token is specified though a pair of <AUTHTOKEN> tags which surround the name of the authentication token to be used. For example, "<AUTHTOKEN>BASIC</AUTHTOKEN>" specifies an authentication token with the name of "BASIC". The name of the authentication token in used will be stored in an environmental variable AUTHTOKEN, which can be used for evaluation purposes. This variable may only be modified through the AUTHTOKEN tag. In case this operation fails, the operation sets the ERROR variable.

Methods include scripts that are a set of function-like routines that include instructions used to authenticate with the source in question. Each method includes one script specified inside a pair of METHOD tags that are executed when a method is invoked. From within a script, another method may be invoked. Attributes from authentication tokens may be referenced inside a script. Within a script, commands are provided in the form of tags. Supported tags include: PROTOCOL, AUTHTOKEN, JUMPMETHOD, SET, UNSET, SEND, IF, ELSE and RETURN.

A <JUMPMETHOD> tag embraces the name of another method, as a result of this tag, execution of the current method will be stopped, and the new method will be called. For example, the sequence "<JUMPMETHOD>main</JUMPMETHOD>f" results in an authentication method called "main" being executed. The environment is not reset, so any environmental variables remain in effect. A subsequent <RETURN> tag in the jumped to method does not return execution to the next instruction after the JUMPMETHOD tag because a JUMPMETHOD functions in effect like a GOT0 statement. In the method being called, a main script is executed as a result. If an unknown method is referenced, the ERROR variable is set, and execution continues at the next statement in the calling method.

A <SET> tag is used to add and set environmental variables. As the environment is initialized when a first method is started and not destroyed until the end of execution of the last return of the final method, the environment stays intact during jumps from one method to another method. The name of the variable to be set is defined by use of a NAME attribute in the start tag, followed by the name of the variable. The SET tags embrace the value that is assigned to the variable. Script commands are not allowed inside of SET tag bodies; however, variable substitution is performed. For the purpose of a SET tag, the variable does not have a leading $. In all other places in the script, except in other tag headers where there is a reference to a variable name, such as in the IF tag, anything with a leading $ is treated as a variable name, which is substituted by the value for the variable from the environment. In order to insert a literal $ at any place in the script, it should be represented by using $$. Some examples: "<SET NAME="test">TestText</SET>ts" sets the variable "$test" to the value "TestText". The subsequent command "<SET NAME="test2">$TEST$$$TEST</SET>" sets the variable "$test2" to the value "TESTText$TextText". References to variables that do not exist at any point in the script result in an empty string being returned. All variables have no type and they may include any mix of characters. Reserved AUTHMETHOD and AUTHTOKEN variables may not be set. In the case where a SET command fails, an ERROR variable is set with an appropriate error value.

An <UNSET> tag is used to remove a value from a variable in the environment. The name of the variable to be unset is defined by use of the NAME attribute in the start tag, followed by the name of the variable. Alternately the ALL attribute may be used to remove all variables from the environment. Continuing the SET example above, "<UNSET NAME="test"></UNSET>" would remove the variable "$test" from the environment. It is legal to unset variables that do not exist. Doing so will not generate an error. To remove all variables from the environment, the code used would be "<UNSET ALL></UNSET>". Whenever a method interpreter starts method execution and stops method execution, the interpreter performs an implied <UNSET ALL></UNSET>, as it's first and last instruction. UNSET will clear the $ERROR variable as well. The AUTHMETHOD and AUTHTOKEN variables may not be unset. In case the UNSET command fails, the ERROR variable is set to an appropriate value.

A <SEND> tag is used to transmit information using the protocol specified and active at the time the send command is issued. SEND uses an URL argument, which specifies the Web location of the host to connect to, and optional USER, PASS, and POST arguments. The URL arguments is in the format of a normal URL, without the leading Protocol specification. For example "https://www.accessserver.com/" is represented as \URL=www.accessserver.com". The USER argument is what will be used for basic authentication on the Web page if requested by the server. The PASS argument is used as the password for basic authentication if needed. The contents of these three arguments are subject to variable substitution. A POST is used to submit data, in the form of a form-post in the case of the HTTP or the HTTPS protocol, and in the form of appropriate data (i.e. Attribute/Value pairs, etc) as specified by other protocols. In case the POST argument is present, the tags embrace the information in the form fields that is to be submitted to the access server. In all other cases the information between the two tags will be ignored. Between the two tags for a POST operation may be additional scripting tags, with the exception of other SEND tags. When the SEND tag is completed, the information from the :access server is retrieved in to variables in the environment. While this retrieval happens, variables are translated so that no conflicts occur with variable names by translating any $ signs to $$. Depending on the method used, the variables will have different information and all variable names start with GOT_.

For the HTTP and HTTPS protocol, the following variables are returned. GOT_HEADERS includes the complete headers received from a Web server. GOT_HTML includes an HTMLK document retrieved from the server. For each form returned by a Web page, there will be a separate set of variables which define the relevant data that define the form and this data will be grouped by form name. For example, in the following descriptions, a form name will be substituted for "fff". If the form name includes a $, it will be replaced by $$. Fields in individual forms are represented by "ddd", where ddd is the field name in the form, again, if needed, $ will be substituted for $$. "GOT_VAR_FM_fff" includes a method to use for form "fff", "GOT_VAR_FU_fff" includes the Post URL for form "fff", "GOT_VAR_FT_fff_ddd" includes the field type for field "ddd" in form "fff", and "GOT_VAR_FD_fff_ddd" includes the data in field "ddd" in form "fff".

As a further example, assume a URL, "https://www.test.com/", includes the following HTML document:
<HTML><BODY>
   <FORM METHOD="POST" NAME="TestForm" ACTION=https://www.test.com/submit.cgi>
      <INPUT TYPE="hidden" NAME="field1" VALUE="te$t">
      <INPUT TYPE="text" NAME="username">
   </FORM>
</HTML></BODY>

The following method tags would retrieve the HTML document:
   <PROTOCL>HTTPS</PROTOCOL>
   <SEND URL=www.test.com></SEND>,
resulting in the following environment variables being set:
   GOT_HEADERS includes headers sent back by the Web server
   GOT_HTML includes the HTML document shown above, with the note that the VALUE portion of field1 would read "te$$t".
   GOT_VAR_FM_TestForm includes "POST"
   GOT_VAR_FU_TestForm includes "www.test.com/submit.cgi"
   GOT_VAR_FT_TestForm-field1 includes "hidden"
   GOT_VAR_FT_TestForm-username includes "text"
   GOT_VAR_FD_TestForm_field1 includes "te$$t"
   GOT_VAR_FD_TestForm_username would not be set.

To post data for the received form, the following code could be used:
<PROTOCOL>HTTPS~/PROTOCOL~
<SEND URL="$GOT_VAR_FU-TestForm" POST>
   <INPUT TYPE="$GOT_VAR_FT_TestForm_field1" NAME="field1"
   VALUE="$GOT_VAR_FD_TestForm_field1">
   <INPUT TYPE="$GOT_VAR_FT_TestForm_username" NAME="username"
   VALUE="$GOT_VAR_FD_TestForm_username">
</SEND>
This send action will return more variables. It should be noted that the contents of a variable stays in the environment until the variable is explicitly unset or overwritten.

An <IF> tag is used to evaluate variables. It has three Arguments; V1, COMP and V2 thus enabling basic value comparison. V1 and V2 are compared based on the method specified by COMP. If the outcome of the IF is FALSE, the ELSE tags inside the IF tags are found, and the code they embrace is executed. If the IF is TRUE, all code between the IF tags is executed except for any code embraced by the ELSE tags. IF and ELSE tags may be nested. COMP can be EQ (True if both values are Equal), LT (True if V1<V2), GT (True if V1>V2), IN (True if V1 is a sub-string of V2), SW (True if V1 starts with V2) and EW (True if V1 ends with V2). For example:

<IF  V1:"$GOT_VAR_FU_TestForm:  COMP="EQ" V2-"POST">
      <RETURN>Method was POST</RETURN>
    <ELSE>
      <IF  V1:"$GOT_VAR_FU_TestForm:  COMP="EQ" V2-"GET">
        <RETURN>Method was GET</RETURN>
      <ELSE>
        <RETURN>Method was Neither POST nor GET</RETURN>
      <ELSE>
      <IF>
    <ELSE>
    <IF>

It should be noted that if a JUMPMETHOD tag is used inside an IF tag pair, the status of IF and ELSE is lost when execution of the new method starts. In case this command fails, the ERROR variable is set.

And <ELSE> tag is used to surround code that should be executed in case the evaluation of an IF statement is FALSE and it resides inside the IF tags. It should be noted that if a JUMPMETHOD tag is used inside an ELSE tag pair, the status of IF and ELSE is lost when the execution of the new method starts.

A <RETURN> tag is used to exit from a method. It has three arguments, EXITSTATUS which is optional. EXITSTATUS indicates the successful or unsuccessful completion of the method in question. If this argument is omitted, it will default to 0, which means a successful exit. An exit status of anything other than 0 is assumed to mean failure. The RETURN tags may embrace a block of HTML that should be presented to the user when this exit point is reached. In case authentication succeeds, a simple <RETURN></RETURN> tag will do. In case of an error, code like this may be helpful: "<RETURN EXITSTATUS=1><H1>ERROR!</H1>An error occurred during Authentication. Please call tech support and let them know about the following error: <B>$ERROR</B> in method <I>$AUTHMETHOD</I> and token <H2>$AUTHTOKEN</H2></RETURN>"

Tokens are described by token name and attribute value pairs associated with the token. Tokens are exchanged with an access client though an XML interface. Although the tokens include secure information, the information is not in an encrypted form when transferred between a server and the access client. Rather, information is exchanged over an SSL connection, and encrypted upon arrival at the access client end. The responsibility for encrypting and decrypting data lies with the access client.

There will always be one initial token that is used for the purpose of authentication needed to initiate the database exchange. This token is never be removed by the access client, unless a user is disassociated with the access client, or an account is canceled. The initial token is used to obtain an initial batch of tokens and methods, and is provided to an access client in the final step of a signup process. This is done by inclusion of the initial token in a final sign-up web page. The access client monitors all pages coming from the access server sign-up or account administration servers for a piece of XML that updates the initial token, Whenever such an update is triggered, the client initiates a complete update of the token and method databases to ensure the user has the information needed to continue to communicate with the access server. Once the contents of a base token have been changed on the access client side systems, any old tokens will no longer be valid for communications with the access server.

A token name describes a unique identifier for a token. This is the name by which the token will be referred to in a method's authentication token reference. Each token has one token name, which may not be blank. Within an authentication token database, tokens are unique. There is one special token name, namely "BASIC", which is the token used for all database exchanges with the access server, as well as in cases no matching tokens were found for a particular authentication token reference. Tokens that have no name cannot be referenced and are ignored. Each token is defined in a set of <AUTHTOKEN> tags and the token name is specified using the NAME attribute in the start tag, for example: <AUTHTOKEN NAME="BASIC1">.

Attribute value pairs define names and content of variables that hold information in a token which is inserted in the environment when a token is referenced. In addition, the environment is initialized with the values of the BASIC authentication token, if the basic authentication token is not present, the environment will be left blank. Attribute value pairs are defined though a pair of <SET> tags, identical to those used in the <METHOD> script. In addition to the <SET> tag, the <UNSET> tag may be used here as well, including the <UNSET ALL> tag.

FIG. 17 is an XML document including definitions of multiple methods. For example, the exemplary XML document of FIG. 18 includes a definition (1800) of an authentication method named "example_get" for a carrier network with an SSID of "Alpha". The method includes loading (1802) a token named "tok1" and using a user name and password in an http get process 1804 to obtain authentication. The method then checks (1805) for any errors. If an error has occurred, the method returns (1806) an appropriate error message.

The exemplary XML document also includes a definition of an authentication method "example_get_w_realm" 1808 for a carrier network with an SSID of "Bravo". In this authentication method, the authentication method loads (1810) a token with the name "tok1" and performs an initial get (1812) from an access controller to obtain a realm name in a response. The realm name is then used to load (1814) a new token for the specified realm and the new token is used in a subsequent request for authentication transmitted (1816) to the access controller. The exemplary XML document further includes an authentication method 1818 named "example_post" using a post process to request authentication for a carrier network with an SSID of "Charlie". The method loads (1820) a token with a name of "tok1" and makes an initial request (1822) from the access controller. The XML-based method script adds (1824) a user name and adds (1826) a password to post variables to be used in posting a request to the access controller. Once the method sets the post variables, the method requests (1828) authentication by transmitted a post type request to the access controller.

The XML document also includes definitions of authentication tokens to be used by a method. For example, a token 1830 is defined having the name "tok1", a user name 1832 of "micro_carrier_1" and a password 1834 of "pwd1". Another token 1836 is defined having a name of "tok2", a user name 1838 of "micro_carrier_2" and a password of "pwd2". Another token 1842 is defined having a name of "basic" and a realm 1844 of "mammoth".

Referring now to FIG. 18, an exemplary method definition includes instantiation (1900) of software objects that will be used by a method to access a carrier network. The software objects have the same functionality as the software objects described previously for a method script wherein COM objects were used by the method script. The method instantiates a token object, a http object, a https object, a return object, and an error object. A method can reference one or more tokens, it is possible for a method to use data from as many tokens as the method sees fit. The method then initializes (1902) each object. The method loads (1904) a token called "tok1" using the previously described token database. The method then uses the token in a "get" operation 1906 from a Web site with a URL of "www-test.com using the username and password attributes of the token. If the get operation returns an error, the method returns (1908) and generates an error message in HTML format indicating that an error was generated and the get operation failed. If an exception was thrown during the get operation, the method returns (1910) indicating that an exception was thrown. If no exception was thrown, the method returns (1912) indicating that the get process was successful and the access client has successfully connected to the carrier network.

Figure 9:
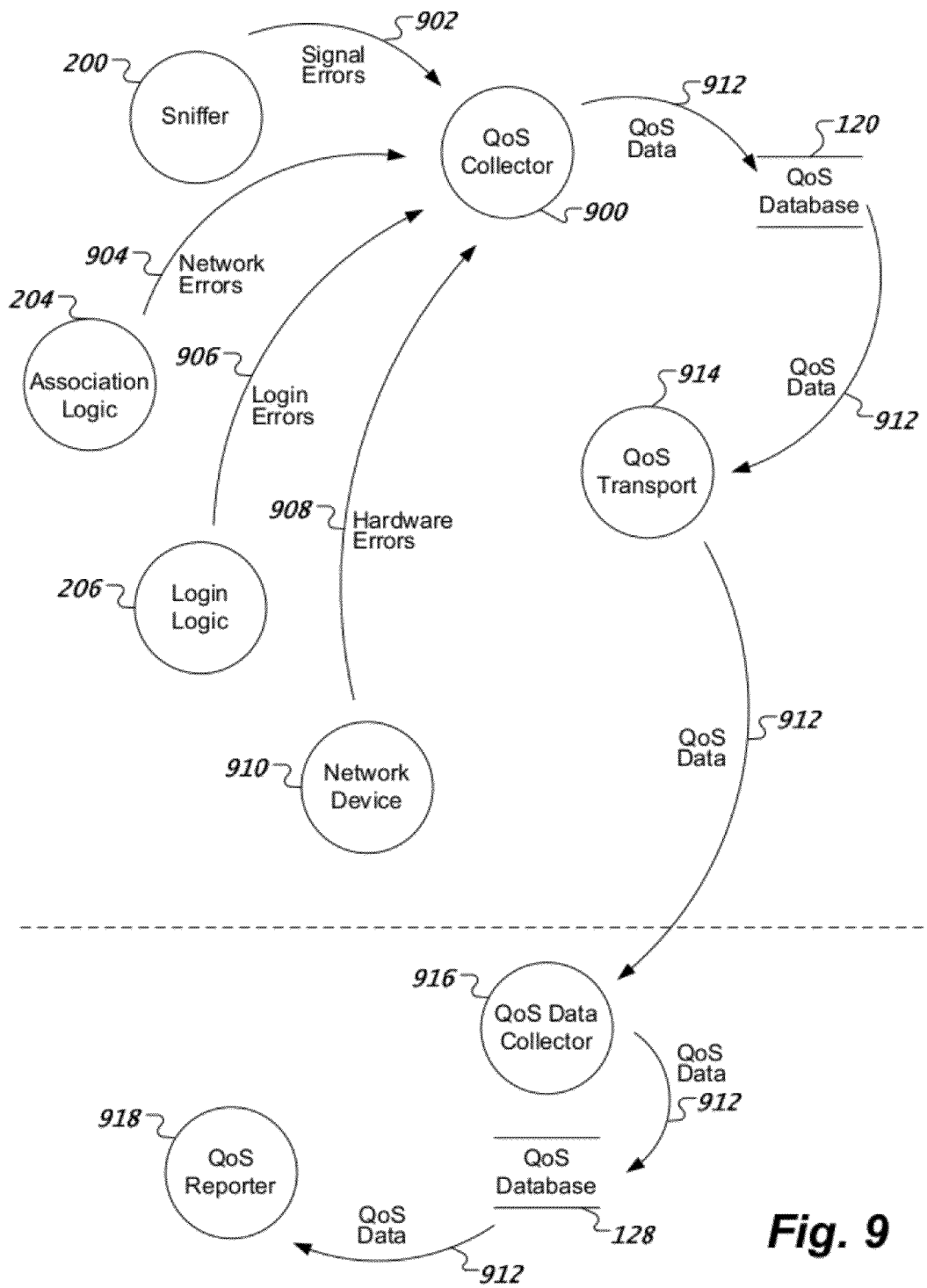
FIG. 9 is a block diagram of an access client being used to collect quality of service data in accordance with an exemplary embodiment of the present invention.

FIG. 9 is a data flow diagram of an access client collecting quality of service data in accordance with an exemplary embodiment of the present invention. An access client includes a Quality of Service (QoS) collector 900 for collection of QoS data from various processes operating within the access client. Previously described sniffer logic 200 detects access points that are available to the access client. While sniffing for access points, the sniffer logic collects signal error data 902 and transmits the signal error data to the QoS collector. While attempting to associate the access client with carrier networks, previously described association logic 204 generates network error data 904 which is transmitted to the QoS collector. While attempting to login to carrier networks, previously described login logic 206 generates login error data 906 that is transmitted to the QoS collector. In addition the QoS collector receives hardware error data 908 from networking devices 910 used the access client's host to connect to the carrier networks. As the QoS collector collects the error data from the various processes and devices, the QoS collector generates QoS data 912 that is stored in an access client QoS database 120. On an aperiodic basis, a QoS transport process 914 connects to an access server including a QoS data collector 916. The QoS transport process gets QoS data 912 from the access client QoS database and transmits the Qos data to the access server's QoS data collector process. The access server's QoS data collector then stores the QoS data in a QoS database 128.

In a carrier network system in accordance with an exemplary embodiment of the present invention, a plurality of access clients are deployed serving a plurality of users. As users move the mobile devices hosting the access clients around, each access client may detect a plurality of access points. Therefore, the QoS data collected by a single access is a sample of the quality of service provided by the access points detected by the access clients. In addition, as many access clients may be deployed in different areas, the collected QoS data can be used to determine service problems throughout a carrier network system. An administrator may use a QoS reporter 914 to get QoS data from the QoS database and generate reports. The QoS data may also be used by users of the plurality of access clients to choose APs and carrier networks. An operator of an access server may also use the QoS data to monitor the performance of carrier networks and individual APs. Additionally, operators of carrier networks may use the QoS data to maintain the carrier networks.

In one embodiment of a QoS collector in accordance with an exemplary embodiment of the present invention, there is some user input on how much QoS data is gathered and sent by the access client. There are also a set of parameters transmitted between the QoS server and the access client whenever the access client connects. This set of parameters tells the access client how much and what type of data to send and is a server controlled throttle, data content and data flow mechanism, for scalability. The QoS server can tell the access client such things as what records to drop by date range, time and detail level, how much bandwidth to use to report data, and how long to hold off before attempting to send QoS data again.

Some of the QoS data collected describes the performance of a carrier network after the access client has made a connection, for example throughput of data or connection time to certain devices on the Internet, which is a more direct measurement of user experiences while accessing a carrier network. Periodic utilization measurements, such as number of packets transferred, number of bytes transferred, number of packets dropped, number of connections reset etc. may also be included in this data. Some of the QoS data is used by the access client to drive the business logic discussed earlier, either directly (based on what the client has noted) or indirectly (based on business rule changes driven by metadata as communicated in directory updates).

Figure 11:
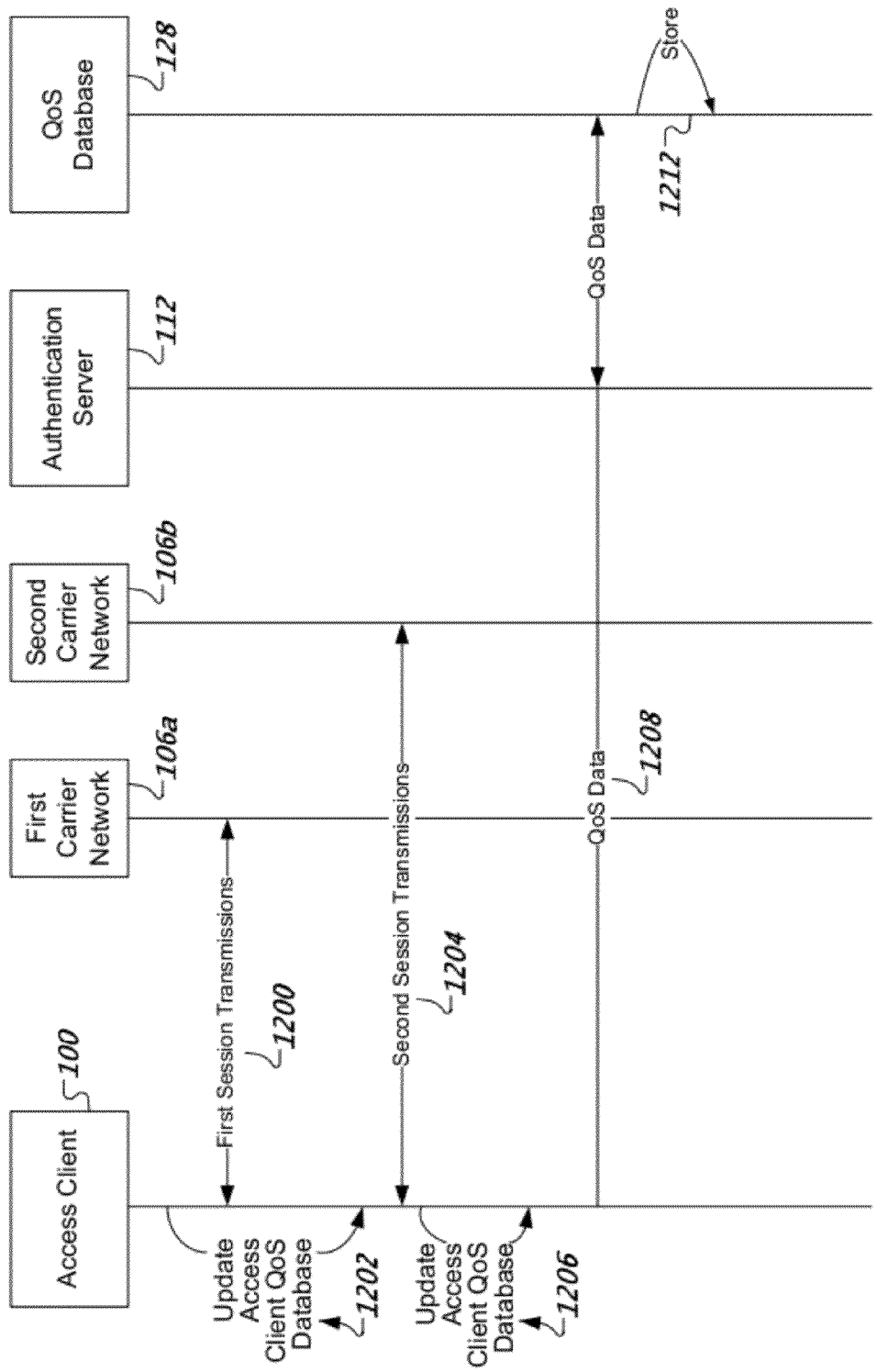
FIG. 11 is a sequence diagram of a Quality of Service data collection process in accordance with an exemplary embodiment of the present invention.

FIG. 11 is a sequence diagram of a quality of service data collection process in accordance with an exemplary embodiment of the present invention. An access client 100 accesses a first carrier network 106*a* an transmits and receives first session transmissions 1200 using the first carrier network. While transmitting and receiving session data, the access client generates QoS metric data which is used to update (1202) a QoS database maintained by the access client. The QoS metric data may include information about how well the carrier network performs during the session such as statistics on dropped or corrupted packets etc. The QoS metric data is stored in association with a carrier network identifier for the first carrier network and an access point identifier for the specific access point used by the access client to connect to the carrier network. The access client may also access a second carrier network 106*b* and collect QoS metric data for the second carrier network while sending and receiving second session transmissions 1204. The QoS metric data is used to update (1206) the access client's QoS database as is done for the first carrier network. In this manner, the access client may collect QoS data for a plurality of carrier networks as a user accesses and uses the carrier networks. On an irregular basis, the access client transmits QoS data 1208 stored in the access client's QoS database to an access server 112 which transmits the QoS data to a QoS database where the QoS data is stored (1212).

In one access client in accordance with an exemplary embodiment of the present invention, QoS data collection is performed by a QoS data server that is separate from the access server. In this case, the QoS server accesses the authentication server to authenticate and identify an access client during the QoS data collection process.

Figure 10:
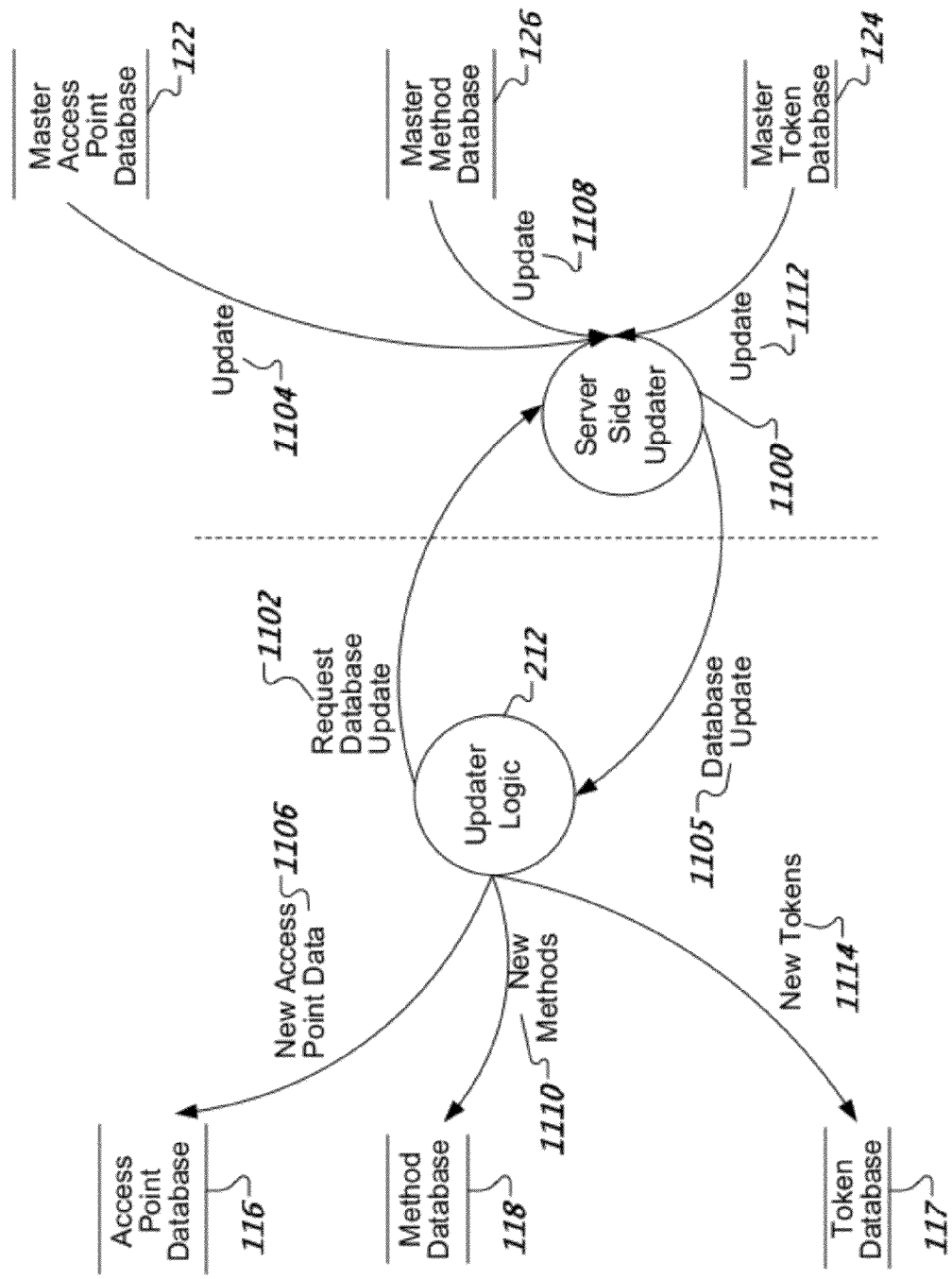
FIG. 10 is a data flow diagram of a user database update process in accordance with an exemplary embodiment of the present invention.

FIG. 10 is a data flow diagram of a user database update process in accordance with an exemplary embodiment of the present invention. An access client includes updater logic 212 for updating the access client's access point database 116. As previously described, the AP database includes information about access points that may be accessed by the access client. The access client maintains the access client AP database by using the updater logic to connect to a update server or update server 1100. The update server is coupled to a server side master access point database 122. Included in the server side master access point database is access point data for each access point belonging to carrier networks associated in a carrier network system. The server side access point database is updated as new access points and carrier networks are added to the carrier network system and as access points and carrier networks are deleted from the carrier network system. Once the access client is coupled to the access server, the updater logic transmits a request for database updates 1102 to the update server. The update server uses the received request to generate a query for the server side master access point database and gets access point database update data 1104 from the server side master access point database. Using the access point database update data, the update server generates an access point database update 1105 that is transmitted to the access updater logic. The updater logic uses the access database update data to generate new access point data 1006 used to update the access client's access point database. In a similar manner, the updater logic may request method database update data 1008 for generating new methods 1110 used to update the access client's method database and token update data 1112 that may be used to generate new tokens 1114 for updating the access client's token database.

In one access client in accordance with an exemplary embodiment of the present invention, the updater logic and update server exchange updates in the form of XML documents. In another access client in accordance with an exemplary embodiment of the present invention, the updater logic transmits access client database versions to the update server and the respective databases are replaced in their entirety. In another access client in accordance with an exemplary embodiment of the present invention, the updater logic transmits a date and time of last update for a database to the update server and database updates are performed incrementally based on new data added to the databases since the last time the access client's databases were updated.

In one access client in accordance with an exemplary embodiment of the present invention, request 1102 is an authenticated transaction in that the specific user asking for an update is known to the update server. In this case, the update server 1100 also speaks to the authentication server and the authentication database for this user authentication. In another access client in accordance with an exemplary embodiment of the present invention, update servers for software and device drivers are also used. In this case, a hardware device driver updater supplies new device drivers to the access client. In addition, a software updater provides patches and upgrades for the access client itself.

In one access client in accordance with an exemplary embodiment of the present invention, updates are performed by a background process incrementally so that only small pieces of a delta update are exchanged between an access client and a update server. For example, only a few kilobytes are exchanged every couple of seconds. If a timer expires and a piece is not yet completed, the process does not attempt to exchange the next piece. In addition, the update servers will not indicate an error if a carrier network fails. The update servers will keep trying to complete the exchange. Once an updater reestablishes connectivity to an access client, even if it is through a different carrier network, the updater continues the updating process where the updater left off. In one embodiment of an access client in accordance with the present invention, updates are exchanged as XML documents having a two step process. Step one identifies the user, and informs the user what updates are available, the order in which to get and apply the updates, and then where to get the updates. In a second sept, this data drives an incremental updater, which does the incremental update described earlier.

In one embodiment of a carrier network system in accordance with the present invention, updates occur prior to the access client being authenticated by the access server. In another embodiment in accordance with the present invention, a carrier network may block certain types of updates but not others. For example, a 3G carrier network might block only software updates prior to authentication, or completely, by implementing a simple filter at the IF layer.

In one embodiment of a carrier network system in accordance with the present invention, updates are based on branding of the carrier networks and carrier network systems. For example, a different branded version of the access client may get a different subset of the AP database or a different set of methods than another brand. An example of a branded carrier network is a carrier network owned by a telecommunications company which will only use their own networks, in which case the access clients distributed by the telecommunications company gets a different AP database than other branded access clients.

In one embodiment of a carrier network system in accordance with the present invention, the update methods are extended to support per-user granularity as well in that the update servers have the ability to send or withhold certain information on a per-user basis, and the update servers keep track of updater activity per user and per unique software instance. In that way, the operator of a carrier network system knows which user updated to what version (or was denied what version) at what point in time with a particular access client they have as a user may have more than one client.

Figure 19:
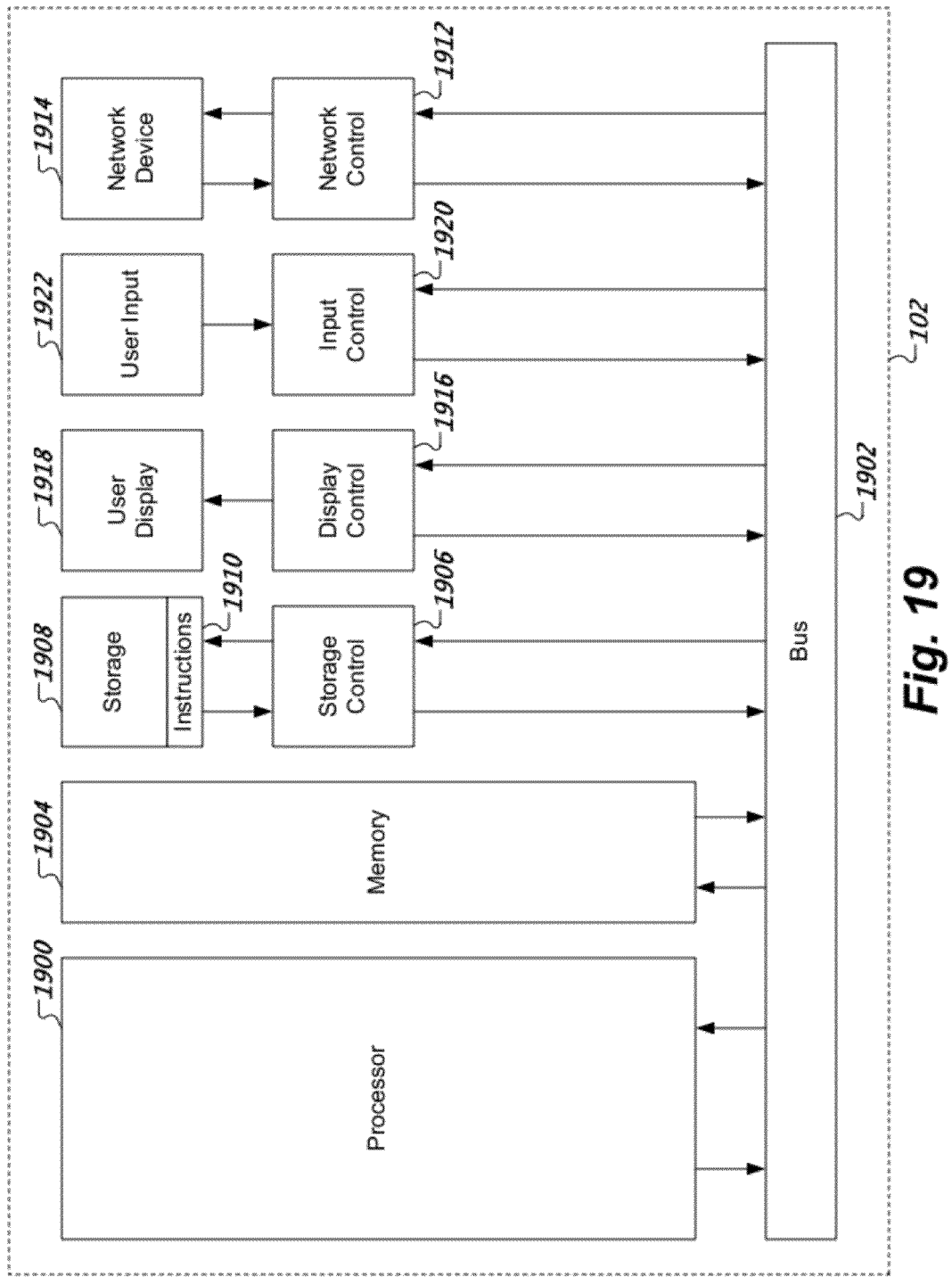
FIG. 19 is a block diagram of an architecture of a general purpose computer suitable for use as an access client host in accordance with an exemplary embodiment of the present invention.

FIG. 19 is a block diagram of an architecture of a general purpose computer suitable for use as an access client host in accordance with an exemplary embodiment of the present invention. An access client host 102 includes a processor 1900, operatively coupled via a system bus 1902 to a memory 1904. The processor is further operatively coupled via the system bus to a storage controller 1906. The storage controller is operatively coupled to storage device 1908. Program instructions 1910 implementing an access client are stored in the storage device until the processor retrieves the program instructions and stores them in the memory. The microprocessor then executes the program instructions stored in the memory to implement the features of the access client as previously described.

The processor is further coupled via the system bus to a network controller 1912 which 1s coupled to a networking device 1914. An access client uses the networking device to transmit and receive carrier network signals as previously described.

The processor is further coupled via the system bus to a display controller 1916 which is coupled to a user display 1918. An access client uses the user display to display previously described elements of a user interface to a user of the mobile computing device.

The processor is further coupled to an input controller 1920 which is coupled to a user input device. An access client uses the user input device to receive user inputs such as previously described user interface selections from a user.

FIG. 20 is a block diagram of an architecture of a general purpose computer suitable for use as an access server host in accordance with an exemplary embodiment of the present invention. An access server host 113 includes a processor 2000, operatively coupled via a system bus 2002 to a memory 2004. The processor is further operatively coupled via the system bus to a storage controller 2006. The storage controller is operatively coupled to storage device 2008. Program instructions 2010 implementing an access server are stored in the storage device until the processor retrieves the program instructions and stores them in the memory. The microprocessor then executes the program instructions stored in the memory to implement the previously described features of the access server.

The processor is further coupled via the system bus to a network controller 2012 which is coupled to a networking device 2014. An access server uses the networking device to receive requests and transmit responses to an access client or an access controller as previously described.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims equivalents rather than the foregoing description.

We claim:

1. A method comprising:
    detecting, by a client, carrier network signals transmitted by a plurality of carrier networks;
    determining carrier network identifiers associated with the detected carrier network signals;
    retrieving carrier network information from an access point database stored at the client based on the determined carrier network identifiers, wherein the carrier network information includes information indicating carrier network systems associated with the carrier network identifiers, respectively, wherein each of the carrier network systems comprises two or more carrier network identifiers;
    selecting a preferred carrier network system from the carrier network systems based on one or more network system preferences stored in the access point database;
    communicating with a preferred carrier network of the plurality of carrier networks, the preferred carrier network being associated with the preferred carrier network system;
    detecting an additional carrier network belonging to an additional carrier network system;
    determining whether the additional carrier network is more preferable than the preferred carrier network based on business logic stored by the client; and
    selectively communicating with the additional carrier network.

2. The method of claim 1, wherein selecting the preferred carrier network system comprises using one or more user preferences stored by the client.

3. The method of claim 1, further comprising:
    retrieving access method information associated with the preferred carrier network system from an access method database stored at the client, wherein communicating with the preferred carrier network comprises using the access method information to establish communications with the preferred carrier network.

4. The method of claim 3, further comprising:
    retrieving a token associated with the preferred carrier network system from a token database stored at the client.

5. The method of claim 1, further comprising:
    updating the access point database in accordance with information obtained from an update server.

6. The method of claim 1, further comprising:
    selecting an alternate carrier network system based on a failure to connect with the preferred carrier network; and
    communicating with an additional carrier network of the plurality of carrier networks, the additional carrier network being associated with the alternate carrier network system.

7. A storage device encoded with program instructions that when executed by one or more processors cause the one or more processors to perform operations comprising:
    analyzing carrier network signals transmitted by a plurality of carrier networks;
    determining carrier network identifiers associated with the carrier network signals;
    retrieving carrier network information from an access point database stored at a client based on the determined carrier network identifiers, wherein the carrier network information includes information indicating carrier network systems associated with the carrier network identifiers, respectively, wherein each of the carrier network systems comprises two or more carrier network identifiers;
    selecting a preferred carrier network system from the carrier network systems based on one or more network system preferences stored in the access point database;
    communicating with a preferred carrier network of the plurality of carrier networks, the preferred carrier network being associated with the preferred carrier network system;
    detecting an additional carrier network belonging to an additional carrier network system;
    determining whether the additional carrier network is more preferable than the preferred carrier network based on business logic stored by the client; and
    selectively communicating with the additional carrier network.

8. The device of claim 7, wherein selecting the preferred carrier network system comprises using one or more user preferences stored by the client.

9. The device of claim 7, the operations further comprising:
    retrieving access method information associated with the preferred carrier network system from an access method database stored at the client, wherein communicating with the preferred carrier network comprises using the access method information to establish communications with the preferred carrier network.

10. The device of claim 9, the operations further comprising:
    retrieving a token associated with the preferred carrier network system from a token database stored at the client.

11. The device of claim 7, the operations further comprising:
    updating the access point database in accordance with information obtained from an update server.

12. The device of claim 7, the operations further comprising:
    selecting an alternate carrier network system based on a failure to connect with the preferred carrier network; and
    communicating with an additional carrier network of the plurality of carrier networks, the additional carrier network being associated with the alternate carrier network system.

13. A system comprising:
    a plurality of carrier networks configured to transmit carrier network signals; and a device including a memory storing an access point database and processor electronics configured to perform operations comprising:

analyzing the carrier network signals transmitted by the plurality of carrier networks;

determining carrier network identifiers associated with the carrier network signals;

retrieving carrier network information from the access point database based on the determined carrier network identifiers, wherein the carrier network information includes information indicating carrier network systems associated with the carrier network identifiers, respectively, wherein each of the carrier network systems comprises two or more carrier network identifiers;

selecting a preferred carrier network system from the carrier network systems based on one or more network system preferences stored in the access point database;

communicating with a preferred carrier network of the plurality of carrier networks, the preferred carrier network being associated with the preferred carrier network system;

detecting an additional carrier network belonging to an additional carrier network system;

determining whether the additional carrier network is more preferable than the preferred carrier network based on business logic stored in the memory; and selectively communicating with the additional carrier network.

14. The system of claim 13, wherein selecting the preferred carrier network system comprises using one or more user preferences stored in the memory.

15. The system of claim 13, wherein the processor electronics are further configured to perform operations comprising:

retrieving access method information associated with the preferred carrier network system from an access method database stored in the memory, wherein communicating with the preferred carrier network comprises using the access method information to establish communications with the preferred carrier network.

16. The system of claim 15, wherein the processor electronics are further configured to perform operations comprising:

retrieving a token associated with the preferred carrier network system from a token database stored in the memory.

17. The system of claim 13, wherein the processor electronics are further configured to perform operations comprising:

updating the access point database in accordance with information obtained from an update server.

18. The system of claim 13, wherein the processor electronics are further configured to perform operations comprising:

selecting an alternate carrier network system based on a failure to connect with the preferred carrier network; and communicating with an additional carrier network of the plurality of carrier networks, the additional carrier network being associated with the alternate carrier network system.

* * * * *